United States Patent
Scimone et al.

(12) 
(10) Patent No.: US 6,647,410 B1
(45) Date of Patent: Nov. 11, 2003

(54) METHOD, APPARATUS AND PROGRAM FOR DELIVERY AND DISPLAY OF INFORMATION FROM DYNAMIC AND STATIC DATA SOURCES

(75) Inventors: Stephen J. Scimone, Massapequa, NY (US); Mark S. Kalish, Merrick, NY (US); Christopher J. Layer, North Massapequa, NY (US); Anthony S. Oliveri, Greenlawn, NY (US); Joshua A. Fink, Nesconset, NY (US); Robert D. Posner, Huntington Station, NY (US)

(73) Assignee: Reuters Limited, London (GB)

( * ) Notice: Subject to any disclaimer, the term of this patent is extended or adjusted under 35 U.S.C. 154(b) by 0 days.

(21) Appl. No.: 09/434,794

(22) Filed: Nov. 5, 1999

(51) Int. Cl.⁷ .............................................. G06F 13/00
(52) U.S. Cl. ........................ 709/206; 709/217; 709/231; 709/329
(58) Field of Search ................................ 709/203, 204, 709/206, 217, 218, 328, 329, 231

(56) References Cited

U.S. PATENT DOCUMENTS

| | | | |
|---|---|---|---|
| 5,481,666 A | 1/1996 | Nguyen et al. | 395/159 |
| 5,689,651 A | 11/1997 | Lozman | 395/237 |
| 5,732,397 A | 3/1998 | DeTore et al. | 705/1 |
| 5,864,827 A | 1/1999 | Wilson | 705/35 |
| 5,893,079 A | 4/1999 | Cwenar | 705/36 |
| 5,899,995 A * | 5/1999 | Millier et al. | 707/102 |
| 5,913,202 A | 6/1999 | Motoyama | 705/35 |
| 5,923,845 A * | 7/1999 | Kamiya et al. | 379/93.15 |
| 5,974,430 A | 10/1999 | Mutschler, III et al. | 707/505 |

OTHER PUBLICATIONS

Tarau P. et al., "LogiMOO: an Extensible Multi-user Virtual World with Natural Language Control" *Journal of Logic Programming*, Mar. 1999, Elsevier, USA, vol. 38, No. 3, pp. 331–353.

Press Release, May 20, 1999, "NewsEdge Works With Microsoft to Bring The Latest Business News to the Desktop".

* cited by examiner

*Primary Examiner*—Viet D. Vu
(74) *Attorney, Agent, or Firm*—Fitzpatrick, Cella, Harper & Scinto

(57) ABSTRACT

A method for delivering and displaying dynamic data using information management software, wherein information is extracted from a dynamic datastream and stored in a server folder for user viewing with an information appliance. A dynamic view manager allows the user to create multi-framed views and save those views for future use.

12 Claims, 16 Drawing Sheets

Microfiche Appendix Included
(14 Microfiche, 257 Pages)

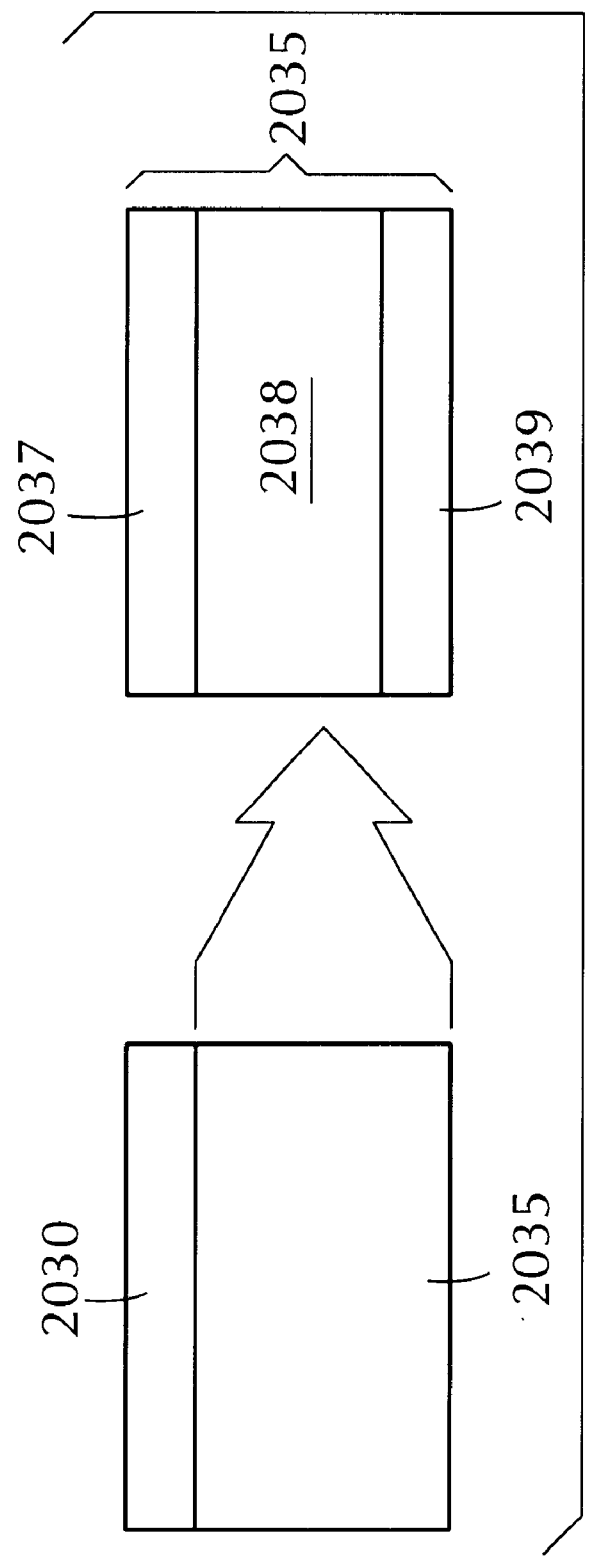

METHOD, APPARATUS AND PROGRAM FOR DELIVERY AND DISPLAY OF INFORMATION FROM DYNAMIC AND STATIC DATA SOURCES

This application includes a Microfiche Appendix that includes 14 microfiche in total, and 257 frames in total. The Microfiche Appendix includes computer program listings consisting of Exhibits A–M listed below. Exhibits A–K are included in microfiche 1/13 to 11/14, respectively, Exhibit L is included in microfiche 12/14 and 13/14, and Exhibit M is included in microfiche 14/14.

Exhibit A: Sample ASP script corresponding to "ASP Scripts 340" of FIG. 2, entitled "index.asp";
Exhibit B: Sample ASP script corresponding to "ASP Scripts 530" of FIG. 2, entitled "client.asp";
Exhibit C: News COM Add-In, corresponding to COM Add-In 622 of FIG. 2;
Exhibit D: Quotes COM Add-In, corresponding to COM Add-In 624 of FIG. 2;
Exhibit E: Portfolio COM Add-In, corresponding to COM Add-In 626 of FIG. 2;
Exhibit F: Limit Minder COM Add-In corresponding to COM Add-In 626 of FIG. 2;
Exhibit G: Reuters Television COM Add-In corresponding to COM Add-In 626 of FIG. 2;
Exhibit H: Market Feed to XML Converter corresponding to "Translation to XML 420" of FIG. 2;
Exhibit I: Quote Server software file ("server.java") implemented on "Data Server 430" of FIG. 2;
Exhibit J: Server Connector software file ("connector.cpp") of "Interface 440" of FIG. 2;
Exhibit K: Quote Data Source software file ("quotedatasource.cls") of "MS OLE DB Simple Provider Interface 470" of FIG. 2;
Exhibit L: Dynamic View Manager software files;
Exhibit M: Sample XML file ("CEToday.xml") associated Dynamic View Manager.

The contents of that appendix are incorporated by reference into this disclosure as if fully set out herein.

A portion of the disclosure of this patent document contains material which is subject to copyright protection. The copyright owner has no objection to the facsimile production by anyone of the document or the patent disclosure, as it appears in the Patent and Trademark Office patent file or records, but otherwise reserves all rights of copyright whatsoever.

BACKGROUND OF THE INVENTION

1. Field of the Invention

The present invention relates generally to a method, system and program for providing to a user information from a variety of sources, such as news and financial data from a dynamic datastream, as well as information from static sources such as network and workstation storage devices, with the potential for new data integration and display opportunities, as well as reduced costs for product development, delivery and support.

2. Related Background Art

There have been developed a number of largely proprietary software-based systems that provide users with news and financial data as it develops throughout the day. These systems are used to retrieve and display information from proprietary news and financial data streams, which deliver new information to the user, without user prompting, as events occur and transactions take place. Examples of such prior art systems include the Reuters Terminal and Reuters Dealing 3000 systems.

Because the software of these prior art systems was largely proprietary, their development was typically from the "ground up"; much of the software had to be written specifically for the contemplated system, and there was relatively little publicly available software that could be utilized to expedite the process. As a result, the prior art systems were expensive and time consuming to develop. Likewise, because the software was largely custom-made by or for the information provider, the prior systems were complex, demanding and expensive to deploy and support.

SUMMARY OF THE INVENTION

The inventors have developed a system that provides to a user news and financial information from a dynamic datastream, together with information from static sources such as network and workstation storage devices. In this disclosure, a "dynamic datastream" is a datastream that delivers new information to a recipient, without user prompting, typically to provide the user with information about recent events and transactions shortly after their occurrence. Data from such a datastream will be referred to as "dynamic data." Correspondingly, in this disclosure "static data" is information that is not changed or otherwise updated, absent user prompting.

The present system is designed to run with commercially-available information management software products for personal computers, other desktop devices, handheld devices, server platforms and other information appliance platforms. Because the basic functionalities are already provided by the commercially-available information management software, the subject invention can be brought to market much faster, and at lower costs, than has been possible in the past. As used herein, the term "information management software" means products that are mass-marketed and distributed to a wide variety of different users, and which provide the users with the ability to organize, view and/or share information. For example, information management software can include e-mail functions, task scheduling (such as a personal or group calendar of due dates), contact information presentation and management (such as records of telephone contacts and persons contacted, their employers, addresses, and personal information) and information collaboration functions (such as permitting a number of users to share use of an application and its data in a conference environment). Current commercially-available information management software includes Outlook, a product of Microsoft Corporation, Redmond, Wash., as well as other software that provides similar functionality.

Also, because the present system requires less custom-written software than has been the case for the prior art systems, the present system is also easier and less expensive to train and maintain a staff to design, test and support, since large portions of the software are the responsibility of the information management software provider. Furthermore, the use of commercially-available information management software improves the degree of data integration and display integration with other applications, which can be offered as part of larger software suites that include the information management software.

Accordingly, it is an object of the present invention to provide a system, method and program that delivers dynamic datastreams from an information provider, or other information source, utilizing commercially-available information management software.

Another object of the present invention is to provide a system, method and program that permit the user to customize how dynamic and static data is received, stored, maintained, generated and displayed, which again utilizes the capabilities of commercially-available software.

Yet another object of the present invention is to provide a system, method and program that allows the user to create multiple framed views containing dynamic and static data, as well as other data and objects.

BRIEF DESCRIPTION OF THE DRAWINGS

FIGS. 4 through 9 are screen displays showing Master Views which display some of the customization features and capabilities provided in the preferred embodiment.

FIG. 10 is a screen display showing an example of the information available in the preferred embodiment.

FIGS. 11A through 11C are flow charts depicting the operation of the News COM Add-In.

FIGS. 13A and 13B are flow charts depicting the operation of the Quotes COM Add-In.

FIG. 15 depicts the Dynamic View Manager initial framesets.

DETAILED DESCRIPTION OF THE PREFERRED EMBODIMENT

Figure 1:
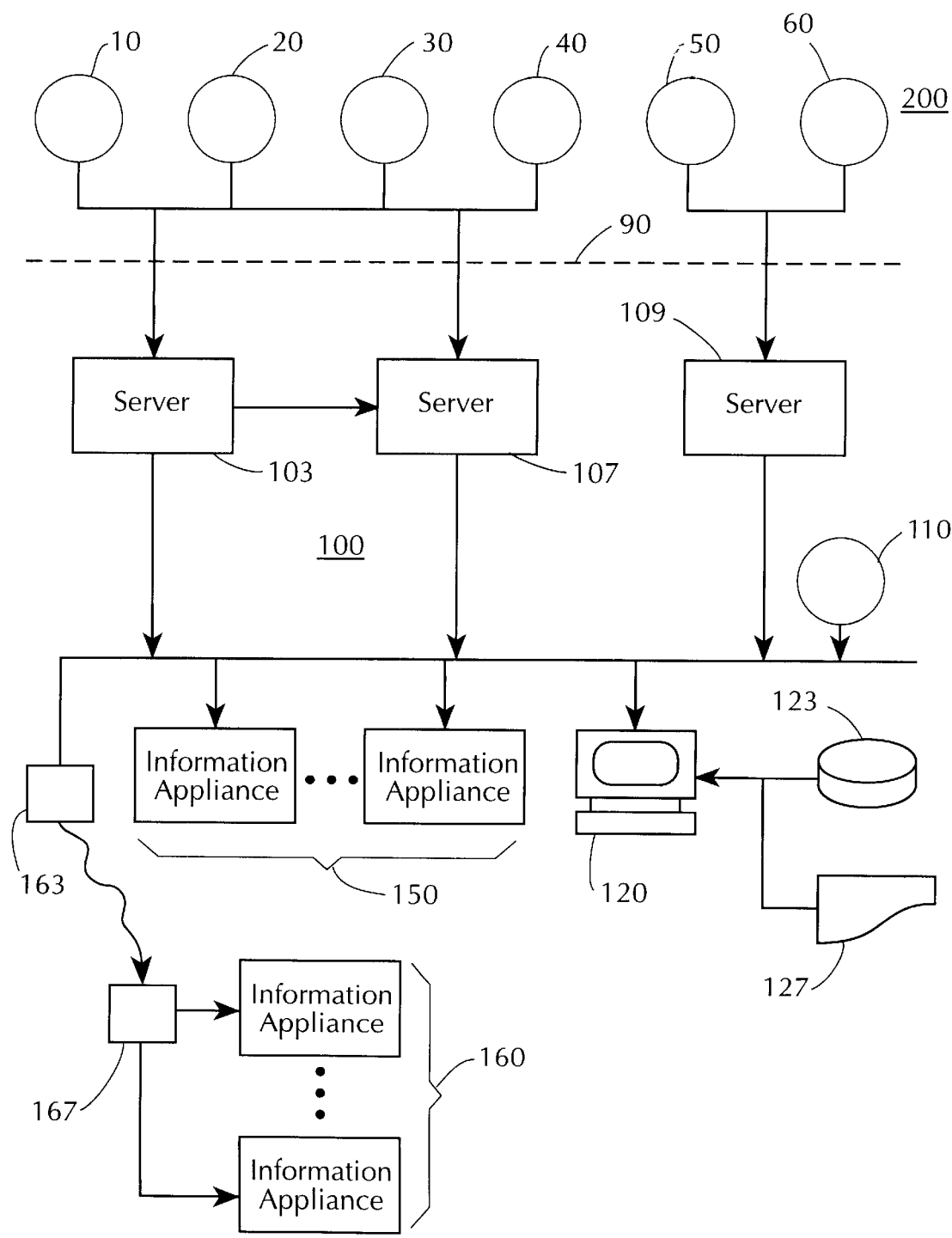
FIG. 1 is a basic diagram of the principal components of the present invention.

FIG. 1 illustrates in schematic form the principal components utilized in the present invention, as well as the data flow paths between them. In particular, there is shown a computer network 100, which allows network users to transmit to and receive information from each other, as well as obtain information from various sources both internal to and external from network 100. The external sources of information, generally denominated 200 in FIG. 1, comprise a number of information services (10, 20, 30, 40). There are also shown two additional external sources of information, internet source 50 and extranet source 60.

Information sources 10–60 are sources of information to be delivered to and utilized by users of network 100. Information sources 10–60 shown in FIG. 1 are merely exemplary and are not exhaustive; it is understood that there can be other external sources of information, depending upon availability and the needs of the users. Dashed line 90 demarcates the components in the present invention which are external to network 100 (above the line) from those which are part of network 100 (below the line).

The information services will now be further described. In particular, service 10 denotes a source of real-time financial and world news ("news source 10"). Examples of news source 10 include Reuters News 2000, Business Wire, PR News Wire, Bloomberg News Service, Bridge News Service and News Edge. Service 20 is a source of real-time trading information for a wide variety of instruments ("quotes source 20"), such as equities, IRS fixed rate instruments, IRS floating rate instruments, etc. An example of quotes source 20 is IDN, which is Reuters' proprietary backbone Network. IDN makes available to subscribers trading and other information from stock exchanges throughout the world, as well as from other sources. Apart from this invention, both news source 10 and quotes source 20 generally are made available by a commercial information provider ("Provider") to subscribers by provision of a dedicated data line with suitable hardware and proprietary software. Each of news source 10 and quotes source 20 is a dynamic datastream, reporting as quickly as possible news and pricing information as it occurs.

In addition to news source 10 and quotes source 20, also shown is source 30. Source 30 is a source of Provider-sponsored static data, such as historical and analytical data as is available in the Reuters Reference Database, the Reuters Fixed Income/Bond Database, etc. Source 40 represents other sources of information from third party providers, such as Lexis/Nexis, Analytics Engines, or similar information services.

In addition to the foregoing sources of information, information is also available from internet source 50. The information available from internet source 50 includes both gratis and fee-based information. Other sources of information from external sources include extranet source 60, which can include information for example from commercial partners who have granted access to their network information for purposes of entering orders and updating shipment information.

While the data from sources 50 and 60 are shown as provided to network 100 via server 109, alternatively each source can be provided with its own server, or the server(s) can be dispensed with, depending upon the design of network 100, and the design and operation of the systems providing data from sources 50 and 60. A "server" is a computer that facilitates the transmission and reception of data between different points, such as between a network and external sources. From a hardware standpoint, a server computer will typically include one or more components for performing the arithmetic and/or logical operations required for program execution, such as one or more microprocessors. A server computer will also typically include disk storage media, such as one or more disk drives for program and data storage, and random access memory, for temporary data and program instruction storage. From a software standpoint, a server computer also contains server software resident on the disk storage media, which when executed directs the server computer in performing its data transmission and reception functions. The server software runs on an operating system, for example Windows NT, which is also stored on the disk storage media. As is well known in the art, server computers are offered by a variety of hardware vendors, can run different operating systems, and can contain different types of server software, each type devoted to a different function, such as handling data from a particular source, or transforming data from one format into another.

Network 100 includes a plurality of information appliances that allow the user to receive, store, organize, view and manipulate information, such as personal computer workstation 120. In addition, a wide variety of other information appliances can receive information from the network. These information appliances are generically denoted 150, 160 in FIG. 1.

Information appliances 150, 160 generally will include at least one user input interface, that permits the user to input instructions, and/or data, such as a keyboard, keypad, touch screen, mouse, trackball, or the like, as well as at least one user output interface, which permits the user to perceive information, such as a video display, speaker(s), a liquid crystal or other flat panel display, a printer or the like. Information appliances 150, 160 will additionally typically include one or more components for performing the arithmetic and/or logical operations required for program execution, such as microprocessors, as well as storage media, such as one or more disk drives and/or read-only memories, for containing a stored program or programs that control the operation of appliances 150, 160, and for containing data, and random access memory, for temporary data and instruction storage.

For example, in the case of workstation 120, it is depicted in FIG. 1 as including a hard disk 123, on which is stored the operating system and application software, as well as user data. The operating system can be for example, a Windows operating system, and the application software can include information management software. Workstation 120 is further depicted as including removable storage media 127, such as one or more magnetic diskettes, CD-ROMs, DVD disks, etc. Such media can be used for transfer of data and programs to and from hard disk 123, as well as for storage of information used and/or referenced during execution of one or more programs on workstation 120. Workstation 120 includes a microprocessor (not shown) for carrying out operating system functions, executing the information management software, as well as executing other programs. Workstation 120 also includes a display, such as a CRT or flat panel display, on which the user can view the items displayed by the information management software, and a keyboard and mouse, for changing the view provided by the information management software, and manipulating data.

Information appliances 150 are directly connected to network 100, whereas information appliances 160 are remotely located, but connected to the network via suitable transmitting equipment 163 and receiving equipment 167. Equipment 163, 167 can comprise modems, or wireless transmitting and receiving units, depending on the nature of information appliances 160. Information appliances 150 can be portable PC docking stations, web TVs, cable system set top boxes, personal digital assistants, and the like. Correspondingly, information appliances 160 can be remote personal computers, handheld personal digital assistants with wireless capability, cellular phones, pagers, and the like. In addition, information appliances can optionally obtain access to network 100 through an internet connection (not shown), and in turn that internet connection can be accessed by the information appliances by utilizing telephone, cable, or wireless technologies, as examples. The number and variety of devices having access to network 100 can also vary widely, depending upon the size of the enterprise providing network 100, its needs, the user's needs, their geographic location, etc.

As shown in FIG. 1, information from sources 10–60 is provided to network 100. In the case of information services 10, 20, 30, 40, the information can be first directed to a services server 103. Although illustrated as a single server 103 for simplicity, it is understood that one or more of the information services can utilize separate servers to provide an interface with the network 100. From the server 103, information goes to the information appliances associated with the network, either directly or through server 107. Alternatively, information from sources 10–40 can be directly directed to server 107, without utilizing services server 103, depending upon the design of network 100, and the design and operation of the systems providing data sources 10–40. Likewise, information form sources 10–40 can be directly directed to network 100 without utilization of either server 103 or server 107.

Server 107 includes messaging and collaboration server software. In the preferred embodiment, server 107 utilizes Exchange, a product of Microsoft Corporation, for its messaging and collaboration functions. In the preferred embodiment, server 107 also includes web server software, which in the preferred embodiment is Microsoft Internet Information Server ("IIS"), running on a Windows platform.

In addition to the external sources of information 10–60, network 100 has internal sources of information. In particular, there is shown source 110, which denotes the information resident on network devices such as disk drives, CD-ROM towers, storage devices, software applications and the like. These resources are available to users of information appliances over network 100, either directly or indirectly through a server computer (not shown). The information from source 110 can include any information internal to the enterprise providing network 100, such as accounting information, financial information, internal analytical tools, etc. In addition to information on network devices, there are also internal sources of information associated with a specific information appliance and/or its user. For example, the hard disk 123 of workstation 120, shown in FIG. 1, can contain information specific to that workstation's user, such as client contact information, scheduling information, reminders, personal stock portfolio data, etc. Likewise, additional information can be contained on removable storage media 127 of work station 120. Of course, personal or user-specific information can also be contained on the network devices referred to above.

As the foregoing shows, there is a great variety of information available to a user utilizing an information appliance on the network. For example, the user of workstation 120 can receive information from subscription services 10–40, from internet source 50, extranet source 60, from network source 110, and from sources associated with the workstation itself, namely disk 123 and media 127. To allow the user to efficiently capture, manage and display the information from this wide variety of sources, the present invention utilizes a number of techniques, described below, for providing information to an information appliance and displaying that information. In one preferred embodiment, workstation 120 utilizes information management software, such as Microsoft Outlook (currently Outlook 2000), for the display and management of the captured information.

Web server and web application technology, languages and programming techniques (utilizing well-known web languages and software components such as HTML, XML, ASPs JavaScript and VB Script) are well-known to one of ordinary skill in the art, and familiarity with this technology, languages and techniques is presumed for the descriptions following. Likewise, the ability to use, and to write applications for, the Microsoft product suite (including Outlook 2000, IIS and Exchange servers), using at least Microsoft Office Server extensions SDK, Microsoft Visual Development tools and Back Office Servers and Server Services, is within the knowledge of one of ordinary skill in the art, and is assumed for the description that follows. The inventors also refer to the two following books for additional information, the contents of which are incorporated herein by reference: *Programming Microsoft Outlook and Microsoft Exchange*, by Thomas Rizzo, Microsoft Press, 1999; and *Building Applications with Outlook* 2000. *Technical Reference*, Randy Byrne, Microsoft Press, 1999. It is understood, nonetheless, that the invention is not limited to implementation using these specific products, or using the products of Microsoft Corporation or any other particular company, but rather can be implemented using any products of similar functionality.

Certain functions of the present invention are preferably executed within the Outlook software by means of Component Object Model ("COM") Add-Ins. A COM Add-In is an ActiveX dynamic link library (or .dll) which adds additional functionality to a Microsoft Office application. COM Add-Ins can be built using any COM development software, such as Visual Basic, Microsoft Visual C++, etc. When these COM Add-Ins are executed at workstation 120, they extend the functionality and usefulness of the Outlook 2000 software, as explained further below. The COM Add-Ins used in this invention are opened when the Outlook software is executed and closes when the Outlook software closes, although the COM Add-Ins can be configured by one of ordinary skill in the art to open and close at other closing points in time or upon the occurrence of other events. The specifics of the COM Add-Ins described herein are readily apparent to one of ordinary skill in the art given this disclosure. In addition, as would be readily apparent to one of ordinary skill in the art, the functions provided by COM Add-Ins herein can be implemented in other ways, such as by use of form scripting.

Figure 2:
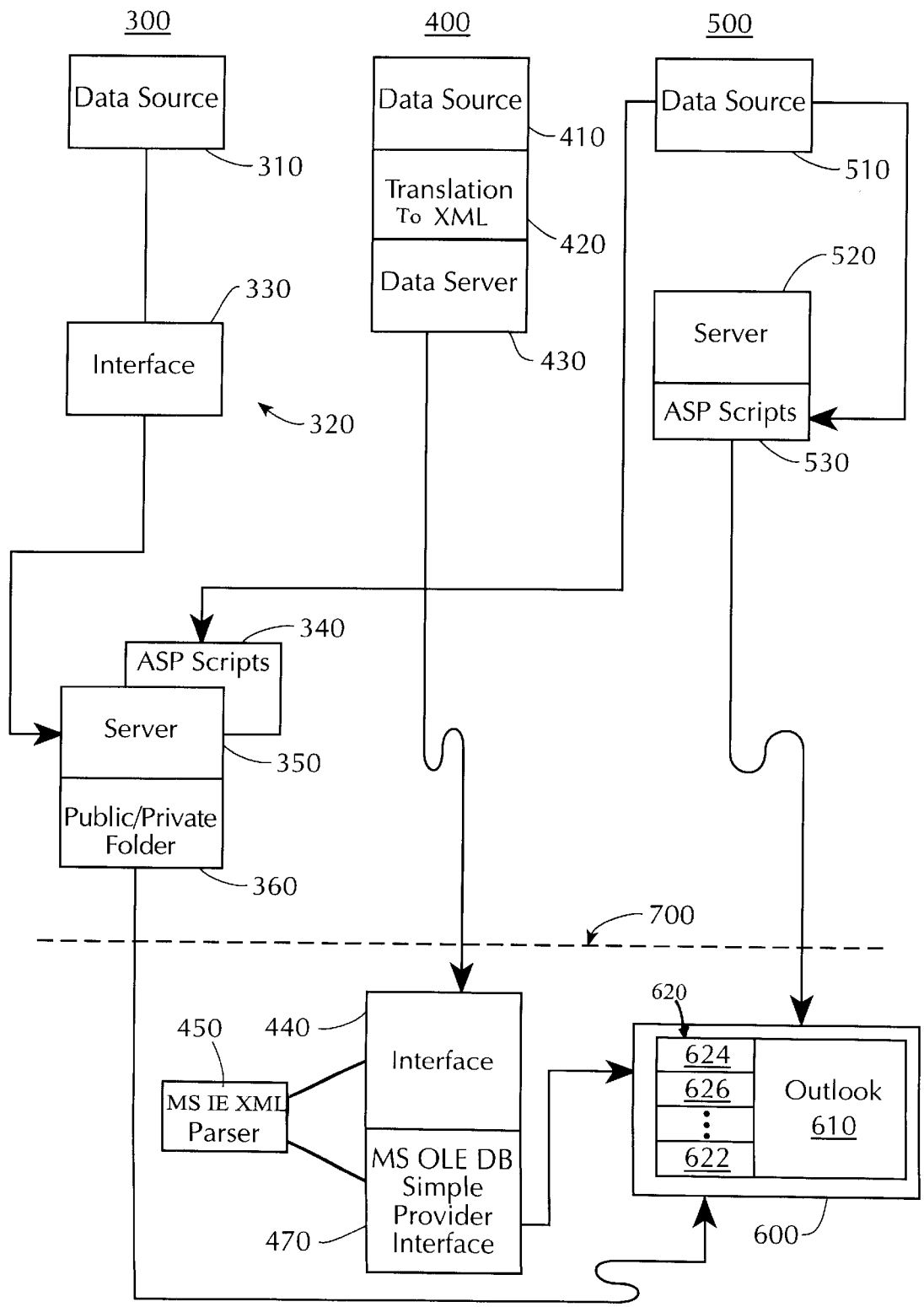
FIG. 2 is a flowchart illustrating the techniques utilized in the preferred embodiment to capture and provide information to a user.

FIG. 2 illustrates the three techniques utilized in the present invention for delivery of information to an information appliance. Dashed line 700 demarcates components resident at the client information appliance (below the line) from those removed from the client information appliance (above the line). Briefly, information is delivered to the client information appliance in one of the following three ways: (1) through a folder on a server, such as Microsoft Exchange server software, (2) through a COM Add-In at the client, or (3) via an Active Server Page ("ASP") script. Each of these techniques will be explained below. For each technique, the data source is logically connected to the client via a server generally removed from the client information appliance. By doing this, much of the software of the present invention needed to interface with the client information appliance can reside on the server side.

The first technique shown in FIG. 2, generally denominated 300, preferably is used for dynamic data streams. In a preferred embodiment, data source 310 is a source of news data, such as Reuters News 2000, and corresponds with news source 10 of FIG. 1. News data sources generally deliver information in a data structure which categorizes the news data and provides event messages when a new news headline is generated.

The data source 310 is in communication with a software "data loader" module 320, which communicates with server 350, containing one or more folders, generically denominated 360. Server 350 corresponds to server 107, shown in FIG. 1. Module 320 can be resident on a services server, such as server 103 of FIG. 1 (not shown in FIG. 2), or alternatively can be resident on server 350. Server 350 communicates with one or more information appliances, one of which is designated 600 in FIG. 2. Information appliance 600 for convenience of explanation corresponds to workstation 120 in FIG. 1, although it is understood that any of information appliances 150, 160 can be substituted therefore. Information appliance 600 contains, in the preferred embodiment shown in FIG. 2, Outlook software 610 and a plurality of COM Add-Ins 620.

As data source 310 publishes news, it is received by software "data loader" module 320, which comprises an interface 330 with news headline and story processing functions to process the data structure and event messages received from data source 310. In the present example, interface 330 comprises software that binds the proprietary news data structure to data structures that are compatible with Microsoft Exchange. The various fields of the news data (date, headline, story, etc.) are then bound in interface 330 to the corresponding fields of a Microsoft Exchange mail object. That mail object is then passed to a public or private folder 360 on server 350, which in this embodiment includes Microsoft Exchange server software. In addition, in this embodiment server 350 also includes web server software, preferably IIS, for reasons described below. Although both the web server software and Exchange server software are shown resident on the same server computer, the web server software can be resident on a different server computer than the Exchange server software.

The permission to access folders within folders 360 can vary among information appliance(s). For example, those with permission to view particular private folders may be selected individuals, or groups of individuals, within an organization. In the preferred embodiment herein, the folders are grouped into public folders and private folder, with permission to view the latter typically restricted to a particular information appliance. Once the mail object containing the news data is in folders 360 within server 350, it may be filtered and viewed at the client information appliance 600 using Outlook software 610, or other software having similar functionality, running on appliance 600.

As briefly described above, the mail object is a Microsoft Exchange mail object that is used to represent news information rather than e-mail information. For example, the "Subject" field, which is a standard Exchange mail item field, is used to receive the "Headline" field of a mail object containing a news item, and the message body of the mail item is used to receive the story text. Other standard fields can be used in similar manners, and non-standard fields can be created, using standard Outlook functions, to accept news feature items, such as story date, story type, product codes, story language, etc. By assigning news item details to specific fields, the standard filters and other features of Microsoft Outlook can be utilized to tailor the news information to the specific needs of the user. For example, just as a client using e-mail can use filters to receive only messages from certain authors or about certain subjects, the client using the present invention may decide to only view news articles written by a certain writer or about a certain topic. Further, similar to a user double-clicking on a displayed subject field to view a corresponding mail item, a user of the present invention need only double-click on a displayed headline of a mail object to retrieve a news story from a story field of the mail object.

Figure 3A:
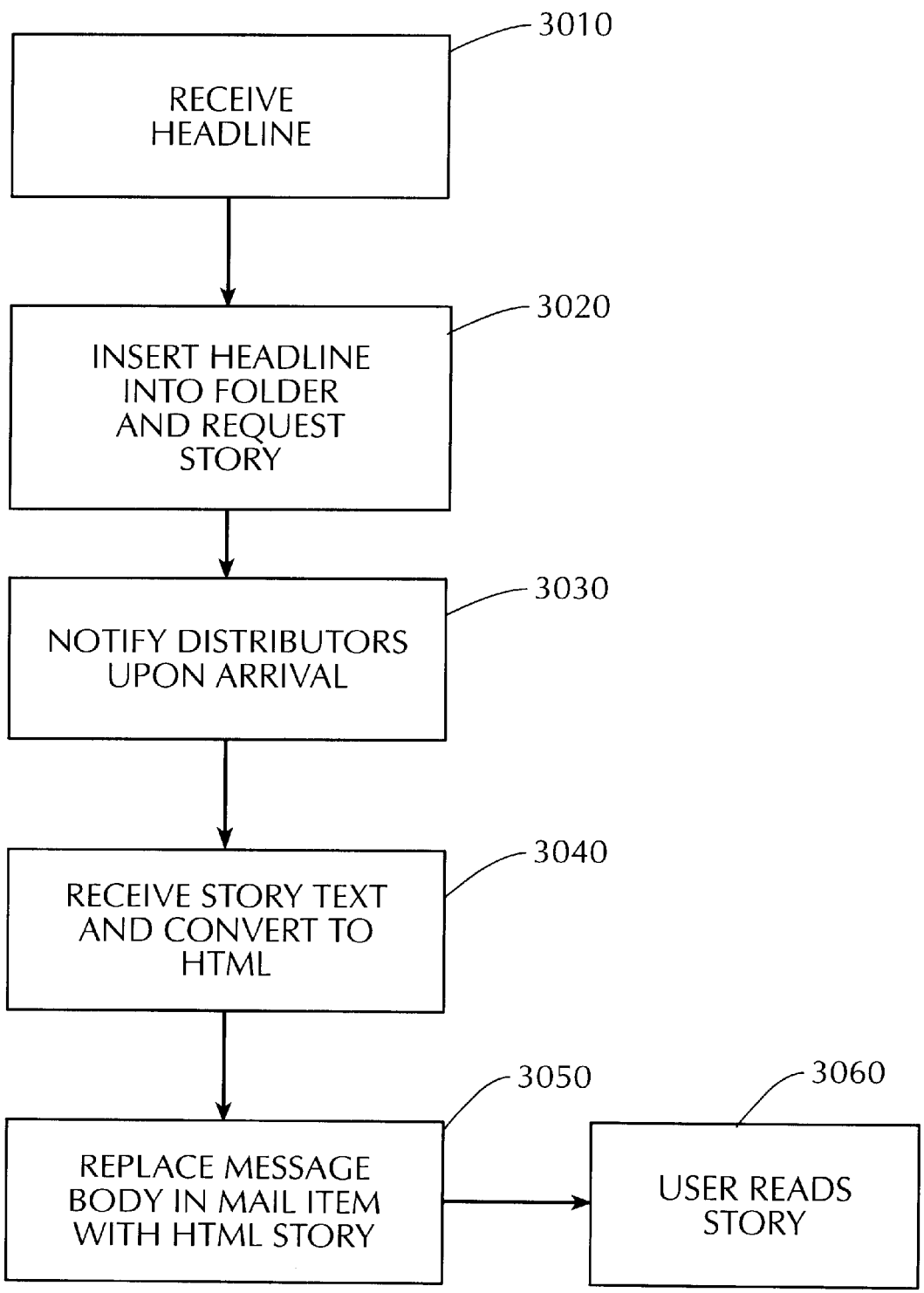
FIG. 3A is a flowchart depicting the processing of news information.

In operation, a Headline Distribution Manager requests and receives a headline from data source 310, as shown at step 3010 in FIG. 3A. In the case of the preferred embodiment, data source 310 is a Reuters data center delivering Reuters News 2000, and the Headline Distribution Manager is a program running as an NT service (as part of interface 330 shown in FIG. 2) on server 103 or on server 107 (corresponding to server 350 of FIG. 2). Alternatively, the Headline Distribution Manager can be located on a server that is part of the user's network (not shown).

Upon receipt of a headline, the Headline Distribution Manager then notifies Headline Distributors resident in interface 330 of the arrival of the new headline. The Headline Distributors are COM objects that maintain as a database the Exchange folders on server 350. Each Headline Distributor has registry values that specify which folder to place headlines into, and what criteria to use to filter the headline.

Each Headline Distributor examines its filter criteria to determine if the headline is of interest; these filter criteria were previously set by the user of information appliance 600 utilizing the mail message filtering tools that are provided with Outlook software 610. If a headline is of interest, the Headline Distributor inserts the Headline into a mail item in its database. In addition, in the event of such interest, the Headline Distribution Manager makes a request to data source 310 for the text of the story. These events are shown in step 3020 of FIG. 3A.

When the data source 310 later delivers the story, the Headline Distribution Manager notifies the Distributors. (Step 3030 of FIG. 3A). Each Distributor again determines whether the story is of interest based on its filter criteria, and if it is, the Distributor invokes an object to convert the story text to HTML. (Step 3040). The Distributor then replaces the message body of the associated mail item with the HTML version of the story (Step 3050), and the user can then open and read the story (Step 3060).

After creation of the mail object, it can optionally be branded with a logo from the Provider of the source of the news, such as a Reuters Logo, by embedding the logo into the story's body. Hyperlinks can also be optionally embedded within the story's body, for example to readily obtain related information (appropriate ASP reference links can be maintained on the web server software of server 350 for such an implementation). As explained below, the news data can be displayed in a Full Story Master View, using Outlook software 610.

News headlines received from data source 310 are inserted into one or more folders of folders 360 on server 350 as mail items as soon as they arrive from data source 310. This permits the user to view a headline as soon as possible. However, retrieval of the story associated with the headline from data source 310 may take additional time after the headline is received. Despite this, the present invention permits a user to view a news headline in a timely manner, even if its associated story has not yet been retrieved, and in addition, view the headline's associated story even if the story has not yet been added in folders 360 to the headline's mail item.

Figure 3B:
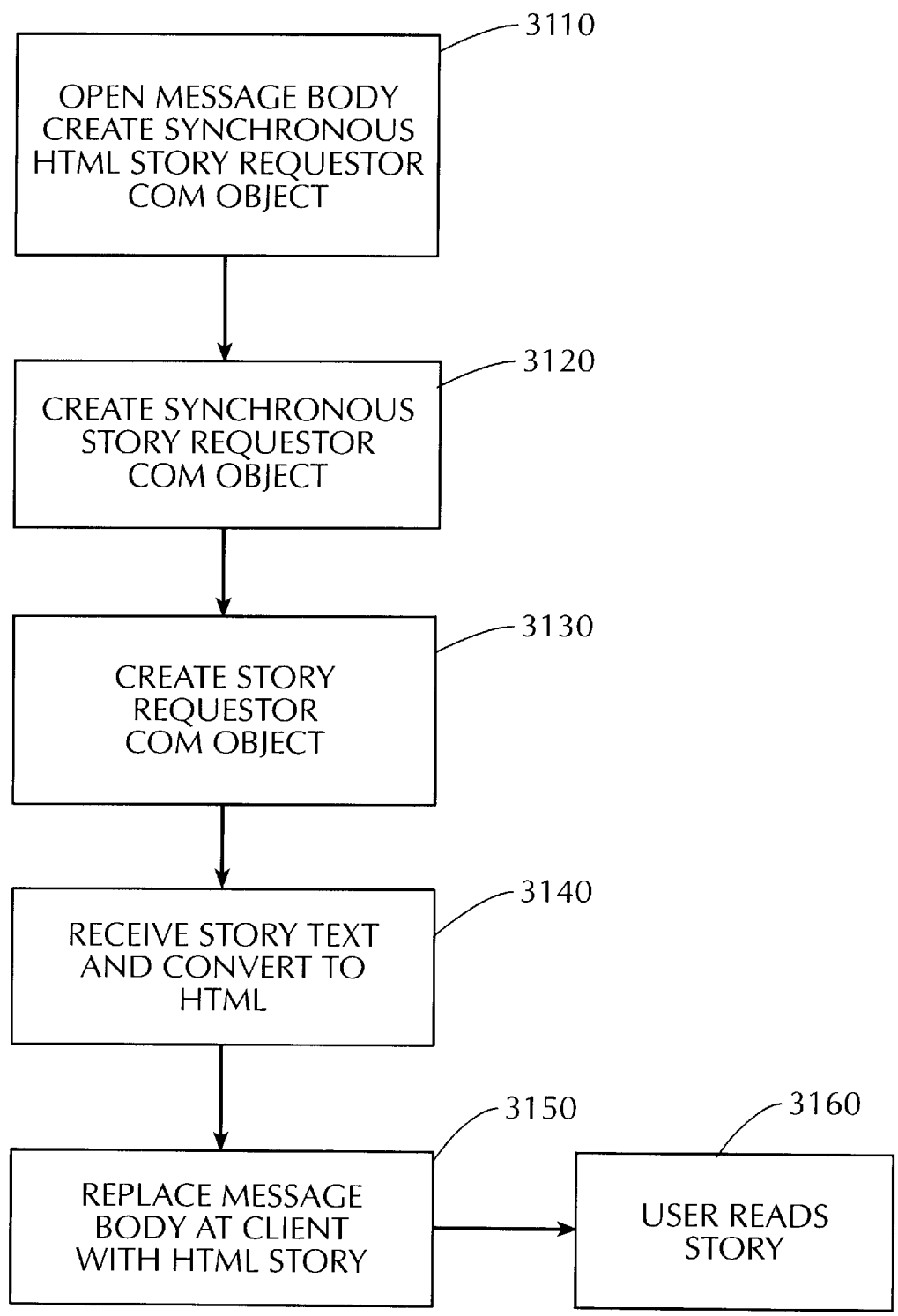
FIG. 3B is a flowchart depicting the handling of user requests for story text.

The description of how a story is viewed without having been added to folder 360 is with reference to FIGS. 3A and 3B. In particular, when the Headline Distributor inserts a headline in a mail item, it also inserts a Java Script event handler in the message body field of the mail item. When a user of Outlook opens the message body by double-clicking on the headline, the Java Script event handler creates a synchronous HTML Story Requestor COM object on the web server software portion of server 350, utilizing Microsoft Remote Data Services ("RDS"). (Step 3110 in FIG. 3B). RDS is a technology for invoking stateless COM objects on web server via the HTTP protocol. The event handler then invokes a method of this COM object, by calling a function that the COM object exposes, and passes to the COM object parameters that uniquely identify the story being requested. In the preferred embodiment, these identifiers are the Reuter's PNAC parameter, which is simply an identifier code for the story, and the story date/time.

Thereafter, the HTML Requestor creates a Synchronous Story Requestor COM object in the web server portion of server 350, and makes a request to it for the story. (Step 3120). That COM object creates a Story Requestor COM object (Step 3130), and makes a request to the Story Requestor COM object for the story. The Story Requestor COM object then makes a request to data source 310 for the story. When the story text is available, the Synchronous Story Requestor receives the story text, and provides it to the Synchronous HTML Story Requestor. That Synchronous HTML Story Requestor then creates an HTML Story Converter COM object, which converts the received story text to HTML. (Step 3140 in FIG. 3B).

After conversion of the text, the Synchronous HTML Story Requestor provides the converted text to the event handler, which then replaces the message body HTML with the story text HTML (Step 3150). This replacement is made only in the message body that the user views, and does not affect the message body in the headline mail item on server 350. The user is now able to view the story using Outlook software 610 (Step 3160).

When the Headline Distribution Manager finally retrieves the story, operation proceeds in accordance with steps 3030, 3040 and 3050 discussed above. The replacement step 3050 obliterates the event handler that was formerly in the message body. As a result, a user then opens the message body after step 3050, the story is simply displayed from the message body, without utilization of the Synchronous HTML Story Requestor as described above.

The technique 300, and the methods and equipment used to insert news headlines and story text into mail items, can be used for multiple data sources. As an example, current news can be maintained in a database separate from historical news. In such a case, the procedure used in FIG. 3A can be used for each of these data sources; in each case, if the headline (be it current or historical) is of interest to a Headline Distributor, the Distributor makes the request to the appropriate Data Source, and the procedure described in FIG. 3A is followed. Likewise, if the user wishes to view a historical story before it is inserted in the mail item on server 350, the method described in FIG. 3B is followed, except that in order to call the historical news data source, the synchronous Story Requestor COM object creates a historical news requestor COM object to make the request for the historical story to the appropriate database.

Figure 8:
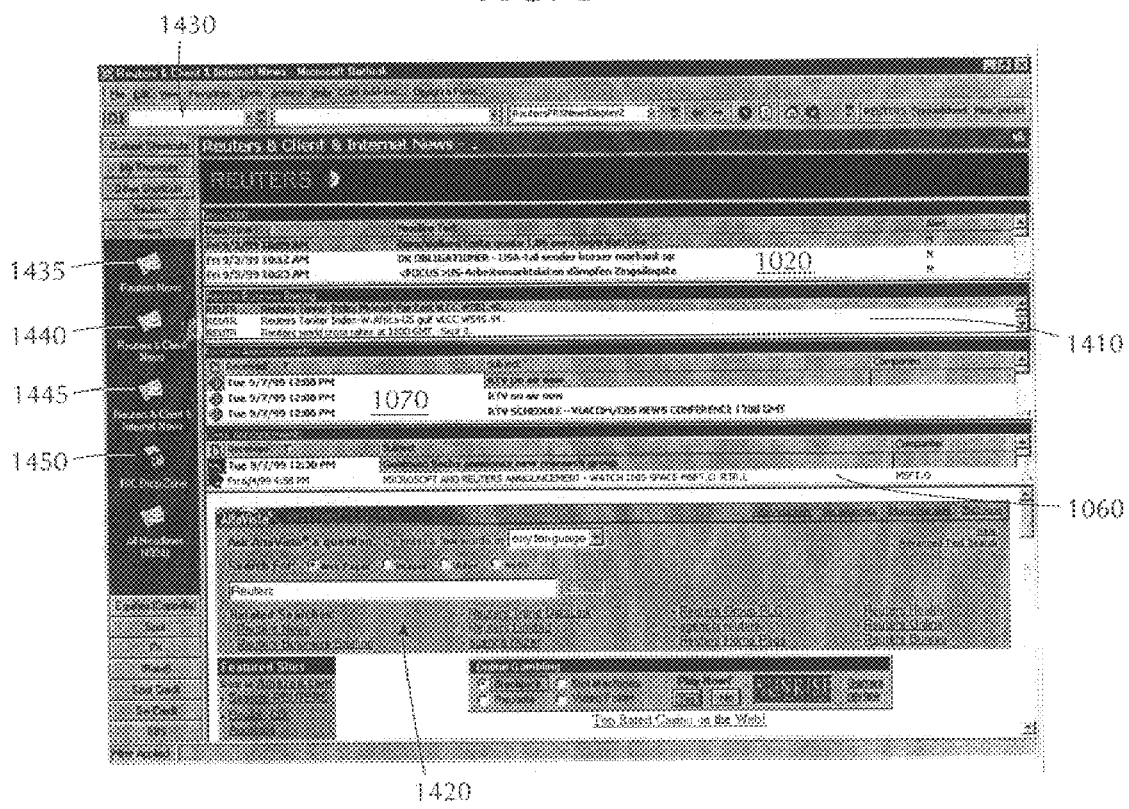
Figure 11A:
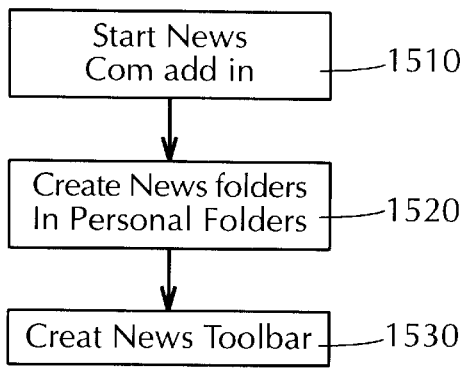

In the case of technique 300, the data from folder 360 is provided to a News COM Add-In 622 of Outlook software 610 (see Exhibit C). News COM Add-In 622 is used for several purposes and performs a number of functions. As shown in FIG. 11A, at the start-up of Outlook software 610, News COM Add-In starts up (Step 1510), and checks for the existence of news folders in the personal folder directory of the user. In the preferred embodiment, any of the following shortcuts that do not exist are created for the user (Step 1520): Provider News, Provider & Client News, Provider & Client & Internet News, and RIC Drop Zone. The first three items are shortcuts to folders, each containing the particular home page property to be defined as the default for the folder. FIG. 8 shows the shortcuts that correspond to the foregoing as follows: Provider News 1435 ("Reuters News" in FIG. 8); Provider & Client News 1440 ("Reuters & Client News"); Provider & Client & Internet News 1445 ("Reuters & Client & Internet News"); RIC Drop Zone 1450. Clicking on shortcuts 1435, 1440 and 1445 brings up the following HTML News Master Views, containing the following Sub-Views, which are described in greater detail later in this disclosure:

Provider News: News, Reuters Business Briefing and Provider Announcements Sub-Views.

Provider & Client News: News, Reuters Business Briefing, Provider Announcements and Client Announcement Sub-Views.

Provider & Client & Internet News: News, Reuters Business Briefing, Provider Announcements, Client Announcement Sub-Views and Internet Sub-Views.

These HTML pages consist of multiple frames containing the Outlook View Control, a news COM object (in the case of Reuters Business Briefing), and a web browser (in the case of Provider and Client and Internet News). These pages display filtered news search results, based upon the property set for the page as a result of dragging and dropping items on the RIC drop zone shortcut. As to RIC Drop Zone 1450, it is a shortcut on the user's Outlook desktop to an Exchange folder containing Outlook Contact items, and is used to set filters for particular News Master Views.

As shown in FIG. 11A, News COM Add-In 622 at Step 1530 also adds a News Toolbar to the Outlook toolbar (assuming the News Toolbar does not already exist). The News Toolbar is a text entry Outlook ComboBox that allows users to specify free-text filters and RIC filters for the news being viewed in the News Master Views. The News Toolbar is labeled 1430 in FIG. 8.

Figure 10:
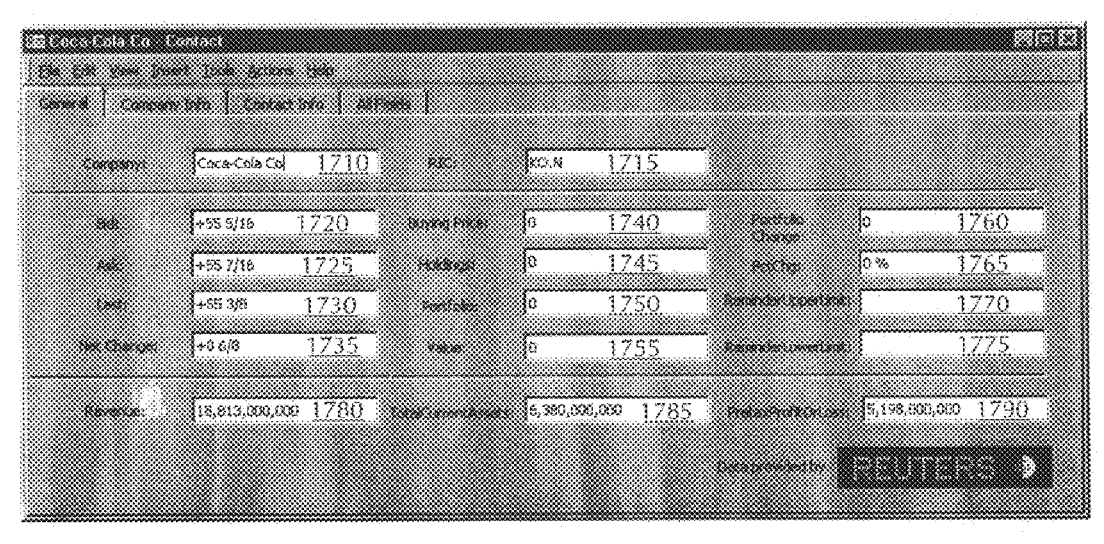
Figure 11B:
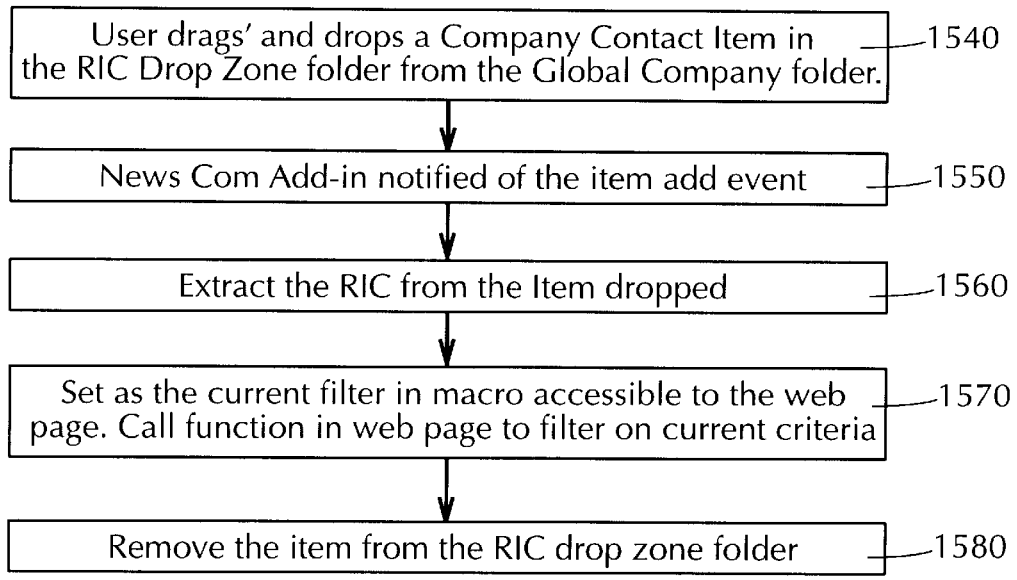

In addition to these start-up functions, News COM Add-In 622 also monitors RIC drop zone 1450 folder for the addition of new items. That is, referring to FIG. 11B, when a Company Contact item from the Global Company Directory Master View (discussed below) is dragged and dropped into the RIC Drop Zone folder 1450 in FIG. 8 (step 1540), News COM Add-In 622 is notified of that event (step 1550). A "RIC" is an information identification code of the Provider (in this case, Reuters) that identifies an instrument (for example, FIG. 10 shows the RIC for Coca-Cola common stock as "KO.N"). As shown in FIG. 11B. News COM Add-In 622 takes the RIC (step 1560) from the corresponding Company Contact item, sets it as the current filter for the News Master View selected by the user for viewing. It does this by calling a function exposed by the ASP associated with the selected News Master View, which then sets the filter on the news being displayed (step 1570). The Company Contact Item is then removed from the RIC Drop Zone folder (step 1580). The Company Contact Item is a standard Outlook Contact form whose fields are re-labeled to correspond to information pertinent to the company of interest, using standard Outlook tools. This form is described below in connection with FIG. 10.

Figure 11C:
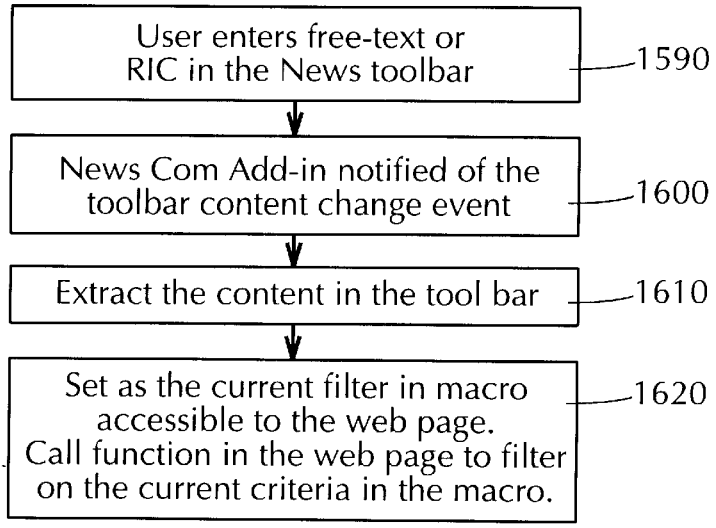

Using News COM Add-In 622, the user can also change the news filter using News Toolbar 1430. Referring to FIG. 11C, when the user enters a RIC or text in News Toolbar 1430 (step 1590), the News COM Add-In 622 is notified of the event (step 1600), the tool bar content is extracted (step 1610) and that content is set as the current filter for the News Master View being viewed by the News COM Add-In (step 1620). This is done by calling a function via a macro exposed by the ASP that corresponds to the News Master View selected by the user. This results in the filtering of the news being displayed.

In addition to these functions, News COM Add-In also takes search criteria entered by the user as described above and passes it into an Alta Vista search string in an ASP script in scripts 530, shown in FIG. 2 (a sample ASP script is attached as Exhibit B).

This information is then sent by the ASP script to data source 510 of FIG. 2, which in this case corresponds to an internet source.

Technique 300 is not limited to use with company news data; rather, it can be advantageously utilized with any dynamic datastream.

Technique 400, shown in FIG. 2, is also useful for delivery of dynamic datastreams. However, in comparison to technique 300, technique 400 is preferably used for delivering more or less constantly changing information, such as financial market trading information. In the preferred embodiment, data source 410 is price data corresponding to quotes source 20 in FIG. 1. The data can be Reuter's Marketfeed price data (ASCII), which has been converted from IDN's Marketstream binary data via software consisting of Source Sink Library, resident at data source 410, and JDIST and JSFC software, resident on server 430. The Marketfeed data is then converted into an XML data stream by a software module 420 (see Exhibit H), shown in FIG. 2, also resident on server 430.

Data server 430, which preferably is a Windows NT server maintained by the Provider of data source 410, is responsible for maintaining the connections to the user, and for maintaining in a memory table a registry of the interests for each user, so that the user receives only the price data of interest to him or her (see Exhibit I). When an item from data source 310 matches an item in the memory table, data server 430 transmits the new item to the user, as explained in further detail below. Data server 430 can be remote from the network that includes information appliance 600, or can be part of that network, in which case it would correspond to server 103 in FIG. 1.

There is a TCP/IP remote connection between the data server 430 and the interface 440 at information appliance 600. Interface 440 (see Exhibit J) functions to ensure that the client's registered information is obtained from server 430. The received XML data is segmented by a standard Microsoft IE XML parser 450, and the root of the parsed tree is passed to a Microsoft OLE DB (database) Simple Provider interface 470 (see Exhibit K). Both parser 450 and interface 470 are resident in information appliance 600.

At that point, the information is provided to a Quotes COM Add-In 624. Quotes COM Add-In 624 performs a number of functions. First, upon start-up the Quotes COM Add-In updates items contained in certain Outlook contact item folders requiring current pricing data, such as the "Watch List" and "Portfolio" folders. Watch List folders are folders containing items which the user is interested in monitoring. Portfolio folders are folders containing items corresponding to the financial instruments that a user is holding, or a hypothetical portfolio of the user, or the like. These folders are contained in folders 360, shown in FIG. 2; alternatively, they can be resident on the information appliance 600 of the user. Each user can name his or her own Watch List and Portfolio folders, and each user can have more than one Watch List folder and more than one Portfolio folder.

In addition to updating certain Outlook folders on start-up, the Quotes COM Add-In 624 (see Exhibit D) also updates these folders when any new changes to the data are received from data server 430. In addition, when an item is added to any of the Watch List and Portfolio folders, the Quotes COM Add-In adds events to an Outlook Calendar folder with information relating to the item that was added to those folders. The Quotes COM Add-In checks the value of a particular field of the item added to the Watch List and Portfolio folders and extracts this information and applies the information as an Outlook Appointment item in the user's personal calendar. For example, in the case of equity instruments, dividend dates are added at the time an item is added to a Watch List or Portfolio folder. Subsequently, when an item is deleted from a Watch List or Portfolio folder, the Quotes COM Add-In sends an event to the user's personal calendar to remove the item from the calendar.

Figure 13B:
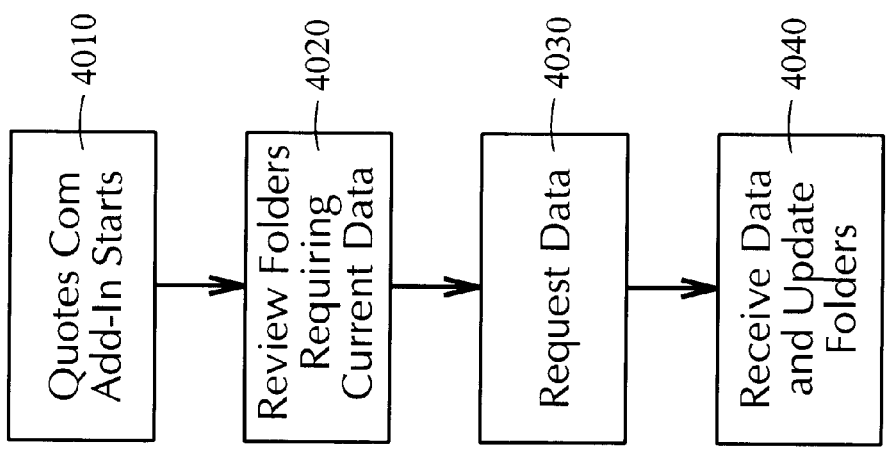
Figure 13A:
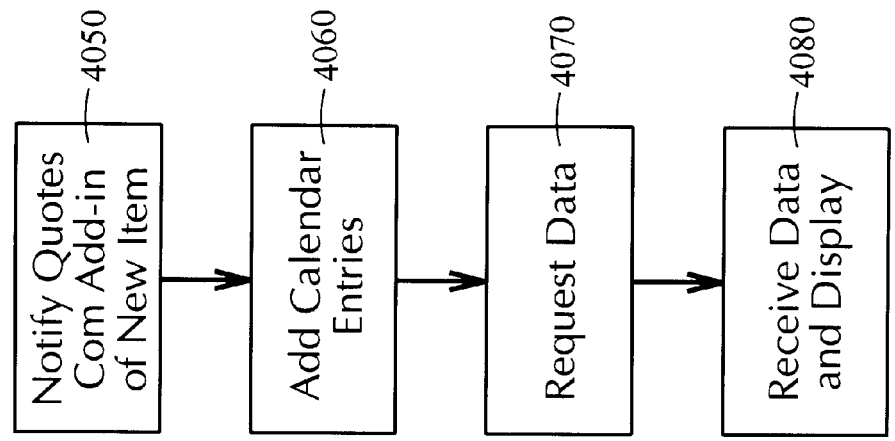

More particularly, Quotes COM Add-In 624 starts up (Step 4010 in FIG. 13A) and establishes a socket connection with data server 430. Quotes COM Add-In 624 then reviews the folders requiring current pricing data (Step 4020), such as Watch List folders, and generates requests to the OLE DB Simple Provider Interface 470 for the latest data for each of the items in these folders (Step 4030). The request is propagated by OLE DB Simple Provider Interface 470 through the interface 440 to the data server 430, which then passes the request to the data source 410. When the data is received, Quotes COM Add-In 624 updates the Watch List folders and other folders requiring the data (Step 4040). Later, when data source 410 generates new information of interest to the socket established by Quotes COM Add-In 624 to data server 430, that information is sent to Quotes COM Add-In 624, which updates the folders as just described.

When a new item is added to a Watch List or a Portfolio folder (such as by dragging and dropping the item from the Global Company Directory, described later, to a Watch List folder), a notification is sent from Outlook software 610 to Quotes COM Add-In 624 (step 4050 in FIG. 13B), and the Quotes COM Add-In reviews the item for relevant fields (such as dividend dates) and inserts those items into an Outlook Calendar entry (step 4060). A request is then sent to data server 430 (step 4070), which stores the new item in its registry as being of interest, and Server 430 proceeds to request the relevant information from data source 410. The information is then sent to Quotes COM Add-In 624 for display in the Watch List or Portfolio Sub-Views, as the case may be (step 4080).

When items are deleted from the Watch List folder, a request to cancel updates is propagated through the interfaces 470 & 440 to the data server 430, which then deletes that item from its registry.

It is understood that the Quotes COM Add-In (as is the case for all other COM Add-Ins described herein), can be extended or modified to perform functions in conjunction with other user applications. For example, the Quotes COM Add-In could add a journal entry when an item is deleted from the Watch List, or add the date to the calendar on which the instrument was added to the Watch List, or "listen" for changes to other fields, or perform yet other functions, as would be apparent to one of ordinary skill in the art.

Price data received using technique 400 can be displayed in such Outlook Views as are appropriate for the anticipated user. In the preferred embodiment described herein, the price data can be displayed in the Watch List Sub-View, Mini Contact Sub-View, Full Quote Sub-View, Real Time Tick Chart Sub-View and/or Composite Index Sub-View, the details of which are described below.

Technique 500, shown in FIG. 2, provide data from data source 510 to information appliance 600. Data source 510 typically is a proprietary historic, analytical or similar source, or an intranet, extranet, or internet source, such as sources 40, 50 and 60 shown in FIG. 1. The data from such sources typically will be static. In particular, ASP files 530 containing HTML templates and scripts are used to dynamically build a collaborative, customized view of data from one or more of those sources. The ASP files are run on an IIS server 520, which corresponds to server 109 of FIG. 1 in the case of data sources 50, 60. In the case of data source 40 in FIG. 1, FIG. 2 server 520 corresponds to FIG. 1 server 103, it being understood that the data flow thereafter is directly to network 100 rather than to server 107.

Server 520 receives data from data source 510 and contains an Internet Server Application Programming Interface ("ISAPI"), which parses an ASP file and executes the appropriate script. An ASP file is activated when the client makes a URL request corresponding to that ASP file on server 520 through Outlook software 610. Software 610 utilizes HTTP in its connection to the IIS server 520. It should be noted that the ASP files can also act as a proxy to the internet, so the client does not have to leave the Outlook application.

ASP files 340 (a sample of which is attached as Exhibit A) on server 350 may also be activated when a client accesses a particular folder in the server 350, which essentially turns the folder from a static data store into a dynamic data store. For example, a client may wish to determine a yield curve for a particular debt instrument from a Watch List folder of folders 360. Behind that folder is an ASP file contained in files 340, which is connected to an analytical service (corresponding to data source 510) that provides such yield curves. When activated by the user, the ASP will cause the information regarding the debt instrument to be sent to the analytical service, which in turn will return the corresponding yield curve to the folder. That yield curve can now be viewed at the information appliance 600 via Outlook software 610.

Significantly, the present invention greatly minimizes the amount of non-"off the shelf" software needed to integrate and deliver many various and disparate sources of data, including both static and dynamic data, into a form useful to a full spectrum of clients. In FIG. 2, the only segments containing non-"off the shelf" software are 330, 340, 420, 430, 440, 470, 530 and COM Add-Ins 620. In addition, the number of lines of code of the non-off the shelf software described in this disclosure is relatively small, because the invention takes advantage of the substantial functionality and capabilities of the pre-existing software.

In addition to the economies achieved by this invention, each user may customize the view of the data, in a way that is meaningful to him or her, thus further adding value to it. This is accomplished by utilizing the display flexibility already provided by commercially-available information management software, to display and manipulate both dynamic data and static data in a variety of useful ways, without the necessity of developing, deploying and supporting complex, custom software.

For example, as described below, dynamic data and static data can be displayed in a number of "Master Views," each of which is comprised of one or more "Sub-Views." These views present the user with a variety of options for displaying and combining dynamic and static data to best suit the user's needs, or to give the user a different, perhaps previously unappreciated perspective. In many instances, the user is additionally able to easily change the information shown in the views using Standard Windows features and techniques, such as "drag-and-drop" actions, dialog boxes, and text entry boxes. In the preferred embodiment, the Master Views and Sub-Views are displayed using the widely-available Microsoft Outlook software, and are prepared in a manner well-known to one of ordinary skill in the art utilizing the standard tools available with Microsoft Outlook 2000, Microsoft Outlook 2000 Developers Edition, Microsoft Visual Studio, and HTML Editing Tools. However, any software having similar functionality, and tools, can be used as well.

While the inventors have chosen to display information in Master Views and Sub-Views, it should be understood that one of ordinary skill in the art could choose other display formats, depending upon the nature of the dynamic and/or static data, the needs and preferences of the user, and the flexibility and capabilities of the information management software that is utilized.

Master Views

"Master Views" contain one or more "Sub-Views," with each containing specific data and display features and functions. The preferred embodiment includes shortcuts among the standard Microsoft Outlook Groups to allow quick access to certain of the Master Views. These shortcuts are implemented using standard Outlook functions.

Figure 4:
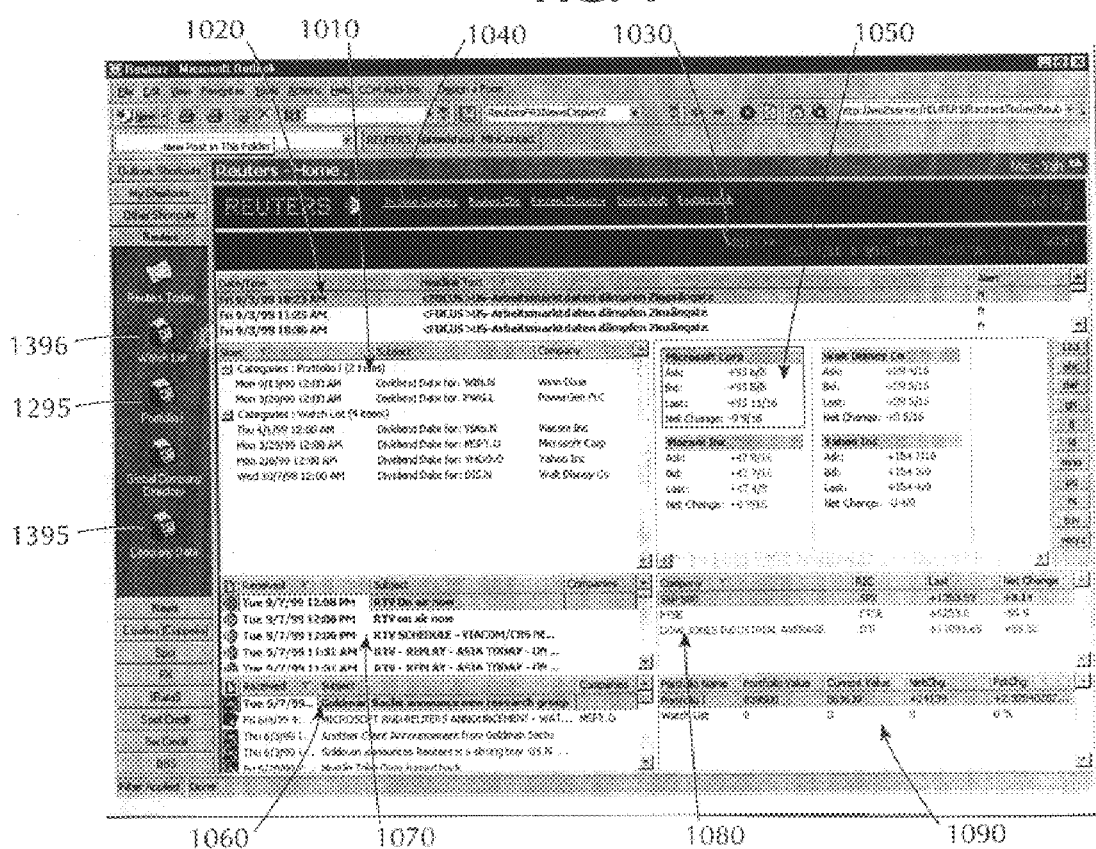

Today: The Today Master View, which is shown in FIG. 4, is an HTML formatted page using frames. The Today Master View contains, in the preferred embodiment, the following Sub-Views: Events Sub-View 1010, News Sub-View 1020, Ticker Sub-View 1030, Links Sub-View 1040, Watch List Sub-View 1050, Client Announcements Sub-View 1060, Provider Announcements Sub-View 1070, Composite Index Sub-View 1080, and Netting Sub-View 1090. These Sub-Views are described below in greater detail.

Figure 5:
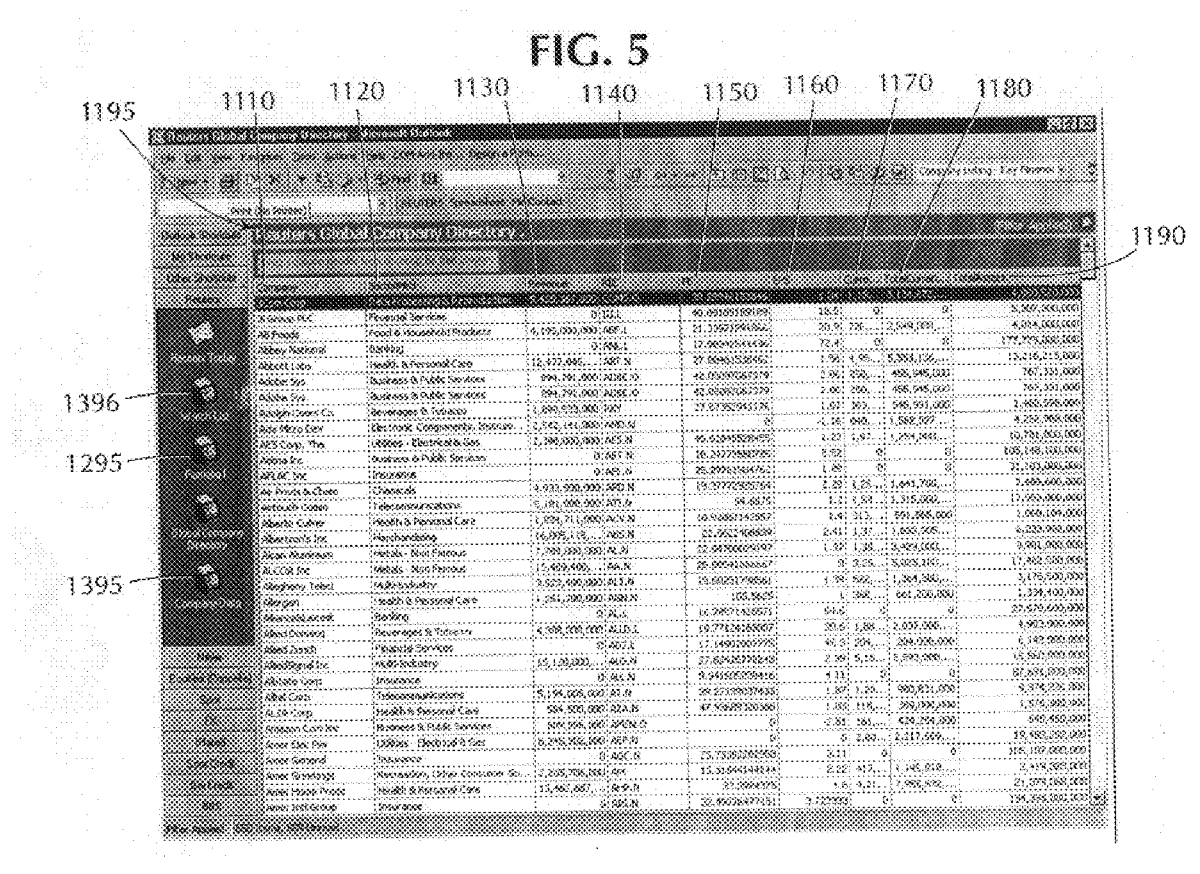

Global Company Directory: The Global Company Directory Master View is shown in FIG. 5. It is a list, on a company-by-company basis, of financial and other information pertinent to the companies. This information is contained in Microsoft Outlook Contact items that are located in a folder, the "Global Company Directory" folder, on server 350 shown in FIG. 2. The fields of these Contact items have been changed, utilizing standard Outlook editing techniques, to display the following information: the company identity (1110), the industry sector (1120), the total revenue of the company (1130), the RIC for the company (1140), the company's P/E ratio (1150), the earnings per share (1160), the current liabilities (1170), the current assets (1180), the total assets (1190), as well as the Provider's logo (1195), in this case Reuters. The data contained in these fields are from source 30, shown in FIG. 1, and is obtained using technique 500, shown in FIG. 2.

Figure 7:
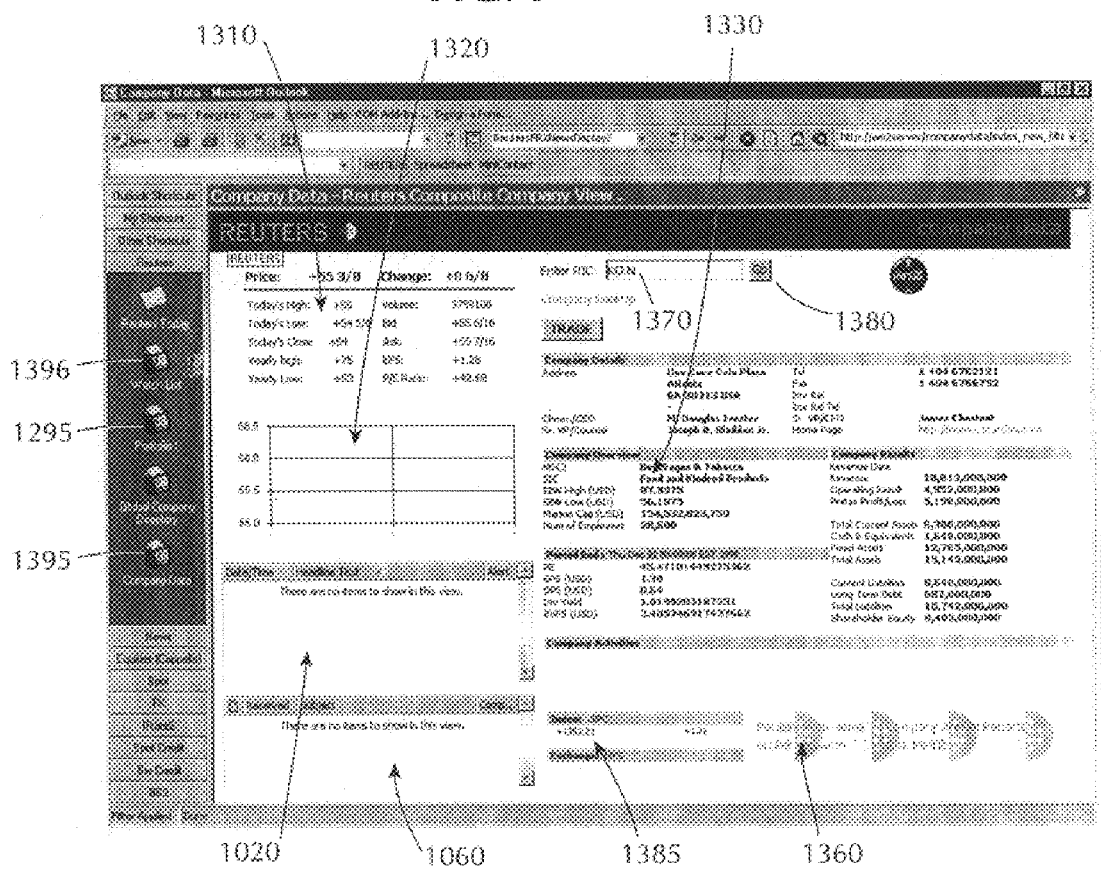

Company Data: The Company Data Master View, shown in FIG. 7, is created by a Company Data ASP located on server 350 in FIG. 2. The Company Data Master View displays the following Sub-Views: Full Quote Sub-View (1310), Real Time Tick Chart Sub-View (1320), Company Detail Sub-View (1330), News Sub-View (1020), Client Announcements Sub-View (1060) and Links Sub-View (1360). Accordingly, this Sub-View provides in one display for the user's convenience a variety of different information pertaining to the company.

When an item is dragged and dropped from the Global Company Directory View onto the Company Data shortcut (1395), a routine is initiated in the Company Data ASP which retrieves from the item the RIC (as explained earlier, a special code that identifies an instrument; accordingly, in this instance it is used to identify the issuer).

The RIC is then set as the current filter for the Company Data page Sub-Views. This is accomplished by scripting contained in the ASP, which reinitializes the page and sets the parameters for each of the sub-views based upon the RIC entered. In the case of sub-views 1020 and 1060, this is set as a filter. For sub-view 1310, it is a property of the COM objects. In sub-view 1330 it is an input parameter to a method for retrieving and formatting the data from the Global Company Directory. Filter criteria may also be set by typing in the RIC in the text entry box 1370 on the Company Data Master View and clicking on the "Go" button 1380 on the view.

News: There are three news Master Views: Provider News; Provider & Client News; and Provider & Client & Internet News. The Provider & Client & Internet News is shown in FIG. 8. It is a framed HTML page containing the following Sub-Views: News Sub-View (1020), a sub-view containing an information product specific to the Provider, in this case Reuters Business Briefing (1410) (delivered from an extranet source, such as data source 60 shown in FIG. 1, using technique 500, shown in FIG. 2), Provider Announcements Sub-View (1070), Client Announcements Sub-View (1060) and Internet Sub-View (1420).

The Provider & Client Master View (not shown) is similar to FIG. 8, except that it omits Internet Sub-View 1420. The Provider Master View (not shown) is similar to the Provider & Client Master View, except that it further omits Client Announcements Sub-View 1060.

News filtering is performed by using the news toolbar 1430 or the RIC Drop Zone shortcut 1450. Users can enter either a RIC or free text in the toolbar text entry box, which is created by the News COM Add-In, or they can drag and drop RIC's from the Global Company Directory onto RIC Drop Zone 1450. On occurrence of any one the above events, the News COM Add-In is notified of the event. The News COM Add-In gets the latest search contents and sets that into a variable exposed by an Outlook macro visible to the ASP. It then calls a function of the ASP to search on the latest search filter available. The ASP then retrieves the contents from the macro and sets the appropriate filter for all the Sub-Views selected by the user, as described in connection with the News COM Add-In above.

Figure 9:

Full Story News: The Full Story News Master View is shown in FIG. 9. It is a Microsoft Outlook mail item form that displays an HTML rendition of the story content in the message body, as discussed above in connection with technique 300 of FIG. 2.

Sub-Views

Described below are the various Sub-Views that the inventors have chosen for the presentation of information through the use of information management software, preferably Microsoft Outlook. However, given the flexibility of currently-available information management software, the Sub-Views given below can be modified by the user in any manner that best suits his or her needs. In addition, the users can generate and customize their own Sub-Views to best meet their preferences.

Links Sub-View: The Links Sub-View 1360, shown in FIG. 7, is written in HTML for viewing in an Active Server Page or HTML. The Links Sub-View contains hyperlinks to Web Pages/Sites and can also contain GIFs of the provider's logo and the page name. Clicking on a hyperlink initiates the user's default web browser and displays the corresponding web page.

More particularly, as shown in FIG. 4, the Links Sub-View contains the Provider logo, a number of Provider-specific network hyperlinks (e.g., In Your Country, Reuters City, Sports Web, Reuters Web), and a label identifying the view (e.g., "Today"). In this embodiment, the links are to specific Reuters' websites, although the invention does not limit or restrict the source or limit of the link, which could appear within this sub-view.

Ticker Sub-View: The Ticker Sub-View 1030, shown in FIG. 4, presents a scrolling ticker display containing real-time stock prices quotes. The stocks on which the Ticker Sub-View reports are those equity instruments contained in an Exchange "Watch List" folder, located in folders 360 of server 350 of FIG. 2.

The Ticker Sub-View 1030 is a COM object (iestock.ocx) distributed with Microsoft Internet Explorer 3.0. It receives price data by reading a file on disk 123 in FIG. 1.

The information on disk 123 is provided by a COM object that reads information contained in the user's Watch List folders, based on a property set in the COM object which identifies the fields of items contained in the Watch List folders that the COM object monitors. The COM object then builds a file containing the data and writes it to disk 123. The iestock.ocx reads disk 123 and displays the data in the Ticker Sub-View 1030, shown in FIG. 4. The Ticker Sub-View can be embedded within a frame of a Web page (Active Server Page or HTML).

News Sub-View: The News Sub-View 1020, shown in FIGS. 4 and 7, is a list of mail items used to display news headlines in an Outlook View Control. The News Sub-View 1020 can be embedded in a frame of a Web Page (Active Server Page or HTML). The news headlines are stored in a folder, the "Headlines" folder, located in server 350 shown in FIG. 2.

The News Sub-View updates news headlines, which scroll down as new headlines arrive in real time. Headlines are received as described in connection with technique 300 of FIG. 2 above. When the New Sub-View is displayed apart from a News Main View, filtering is implemented using standard Outlook filtering functions on a particular field in the item. Double clicking on an item in the News Sub-View displays an Outlook mail item with the story embedded in the body field, as described in connection with technique 300 above.

Several criteria associated with the headline are optionally displayed in the News Sub-View, including the date and time each story was delivered, the story's headline, as well as a field providing for an identifier of any company mentioned in the story, and an indicator identifying the headline as an "alert" (i.e., no accompanying story), or not. The display of these criteria are created using standard Outlook functionality to create user-defined fields. Double-clicking on a headline will display the associated news story, of which FIG. 9 is an example.

Watch List Sub View: The Watch List Sub-View 1050, depicted in FIG. 4, displays in a box format pricing data for instruments that are stored in a personal Exchange folder, the "Watch List" folder. The Watch List folder (or folders) are among folders 360 of server 350 shown in FIG. 2, or alternatively, are maintained locally on the user's information appliance 600. The Watch List Sub-View displays the current real time price data for each instrument listed in the folder, which are typically identified by issuing company in the case of equity instruments. Companies can be added and removed from a Watch List folder by using standard Outlook edit functions (e.g., add, delete), or by dragging and dropping an item from the Global Company Directory onto the Watch List shortcut (1396 in FIG. 4) on the Outlook toolbar.

When the user double clicks, a detailed Contact form is displayed, as depicted in FIG. 10. The fields of that form display the RIC of the instrument of interest (1715), and the name of the issuing company (1710). This form also displays the current bid (1720) and ask price (1725) for the instrument, the price at the last trade (1730), and the net change in price (1735). The form further displays the buying price of the holdings of interest (for example, the user's holdings) (1740), the amount of those holdings (1745), the portfolio purchase price (1750), the current value of the portfolio (1755), the change in portfolio value (1760), and the percent change in value (1765).

To create these fields, the fields of the standard Outlook Contact form were edited, using the standard Outlook editing features, to display appropriate labels so that the user can readily identify the fields. The information displayed in fields 1710 and 1715 originate from the Global Company Directory and are added to the Watch List folder when the user drags and drops the item from the Global Company Directory. The information in fields 1720, 1725, 1730 and 1735 are provided by the Quote COM Add-In. The information in fields 1740, 1745 and 1750 are input directly onto the Contact form for the item by the user, and the values in fields 1750, 1755, 1760 and 1765 are calculated by the Portfolio COM Add-In.

FIG. 10 also depicts fields for Upper Limit and Lower Limit Reminders (1770 and 1775). These fields enable the user to set, reset and cancel limit values for specified equity prices, and be provided with an alert any time a limit value is exceeded by the specified price. The user can input the limit values either directly onto the Contact Form, or through use of the Limit Minder COM Add-In (discussed below). The Contact Sub-View further discloses the total revenue of the company (1780), its total current assets (1785) and its pretax profit or loss (1790). This information originates from the Global Company Directory. (Although the pretax profit or loss information 1790 is not shown in the Global Company Directory display of FIG. 5, that display is merely illustrative of a Global Company Directory, and the pretax profit and loss information 1790 is associated with each company in memory. As will be appreciated by those skilled in the art, the Global Company Directory display of FIG. 5 may be readily extended to include the pretax profit and loss information 1790 in another column.)

Events Sub-View: The Events Sub-view 1010, shown in FIG. 4, consists of Outlook Calendar Appointment items displayed in an Outlook View Control form embedded in a frame of a Web Page (Active Server Page or HTML). The Outlook appointment items are stored in a personal Exchange folder, the "Events" folder, located among folders 360 on server 350, shown in FIG. 2. As shown in FIG. 4, the information displayed in this view is an Outlook calendar display of the dividend dates for the companies that have been placed in a Watch List folder or spreadsheet folder (which are displayed in the Watch List Sub-View and spreadsheet Sub-View, respectively). Double clicking on an item in this view displays the Outlook appointment item. Items are added to and deleted from the Events folder by the Quotes COM Add-In and the Portfolio COM Add-In (described below), when an item is added/deleted from a Watch List folder or the spreadsheet folder, provided that the item contains a value in the user defined dividend date field.

Provider Announcements Sub-View: The Provider Announcements Sub-View 1070, which is shown in FIG. 4, consists of a list of Outlook Mail items that are stored in a public folder, the "Provider Announcements" folder, in server 350 shown in FIG. 2. Provider Announcements are created using an Outlook Mail form and are received using technique 300 shown in FIG. 2. Announcements are accessed by double clicking on an item in the Sub-View.

Provider Announcements Sub-View 1070 is displayed in an Outlook View Control, which can be embedded in a frame of a Web Page (Active Server Page or HTML). One of the fields of this View Control form can be edited, using standard Outlook editing tools, to display the Provider's logo. That logo is then displayed as an icon in the Provider Announcements Sub-View, as is shown in the left-hand column of the Provider Announcements Sub-View 1070 of FIG. 7. The Announcement form itself can be similarly edited to display the Provider's logo. The field identifiers for this mail form can be edited, using standard Outlook editing techniques, to suit the needs of the Provider.

The Provider Announcements Sub-View can be used by the Provider for any information the Provider would like to distribute to users, including advertisements and press releases. In addition, this Sub-View can be linked to still other functions. For example, a television COM Add-In (see Exhibit G) can be utilized to provide real time alerts from a television service, such as the Reuters Television ("RTV") service (RTV distributes financially related programming), and to launch a multimedia viewer, which displays the television broadcast. The RTV COM Add-In examines messages that have been placed in an Exchange folder, the "Provider Announcements" folder, located among folders 360 on server 350. These messages were obtained via technique 300 shown in FIG. 2. These messages have been filtered from the main news headline stream as described in connection with technique 300 above.

If these messages are being used to announce the start of an RTV program, then the RTV COM Add-In starts up a multimedia player, in the preferred embodiment the StarPlayer available from Starlight Networks, Inc., Mountain View, Calif. This player has the ability to render the broadcast Internet Protocol video data stream that is used to distribute RTV. It will be understood that another software component of similar functionality could be used, still within the scope of this invention, to allow the user to view information from a different source.

Client Announcements Sub-View: The Client Announcements Sub-View 1060, which is shown in FIGS. 4 and 8, displays a list of Outlook mail items that are stored in a public Exchange folder, the "Client Announcements" folder, among folders 360 on the server 350. The items in Client Announcements Sub-View 1060 are third party announcements generated using a customized Outlook Post form, and posted from an information appliance 600 to the Client Announcements folder by, for example, a third party user. The clients send their announcements to the Client Announcements folder using the standard Outlook e-mail function, and a suitable communications link (not shown) is provided to server 350 for messaging purposes, such as this one.

Particular client announcements are accessed by double clicking on an item in the Sub-View. Client Announcements Sub-View 1060 is displayed in an Outlook View Control form, set to display particular fields in the Exchange Folder, and can be embedded in a frame of a Web Page (Active Server Page or HTML). One of the fields of this View Control form can be edited to provide the client's company logo. That logo is then displayed as an icon in the Client Announcements Sub-View. The announcement form itself can be similarly edited to display the Provider's logo.

Announcements can be used by companies for any information they would like to distribute to users, including advertisements and press releases.

Composite Index Sub-view: The Composite Index Subview 1080, shown in FIG. 4, is a list of Outlook Contact items on a personal Exchange folder, the "Index" folder, among folders 360 of server 350, shown in FIG. 2. The Composite Index Sub-view is displayed in an Outlook View Control form which can be embedded in a frame of a Web Page (Active Server Page or HTML).

In the preferred embodiment shown in FIG. 4, Composite Index Sub-View 1080 displays current real-time quotes and net changes for various indices, including the Dow Jones Industrials, FTSE, and the S&P 500. This information is preferably obtained using technique 400 shown in FIG. 2, and the fields which display dynamic data are preferably updated utilizing the Quotes COM Add-In, as described above.

Items are added to the Index folder using standard Outlook functionality. When the user double-clicks, a detailed Contact information form is displayed.

Netting Sub-View: The Netting Sub-View 1090, which is shown in FIG. 4, is a list of Outlook Contact items on a personal Exchange folder, the "Netting folder", among folders 360 of server 350 shown in FIG. 2. The Outlook items (as in FIG. 10) include fields that represent the results of calculations, performed by the Portfolio COM Add-In (described below), on certain fields contained in the Spreadsheet and Watch List folders. The Netting Sub-View is displayed in an Outlook View Control which can be embedded in a frame of a Web Page (Active Server Page or HTML).

In the preferred embodiment shown in FIG. 4, Netting Sub-View 1090 displays fields of information summarizing data for two categories of companies defined by the user: companies contained in the Portfolio folder (which may, for example, be some or all the companies in which the user owns stock, or a hypothetical portfolio or the like) and companies contained in the Watch List folder (companies in which the user is interested and so has added to the Watch List). In particular, the Netting Sub-View displays the total current value, net change in value, and percent change in value for the Portfolio(s) and for the Watch List stocks. Thus, changes in the relevant fields of the Portfolio and Watch List folders will change in the fields of the Outlook items contained in the Netting personal folder.

Figure 6:
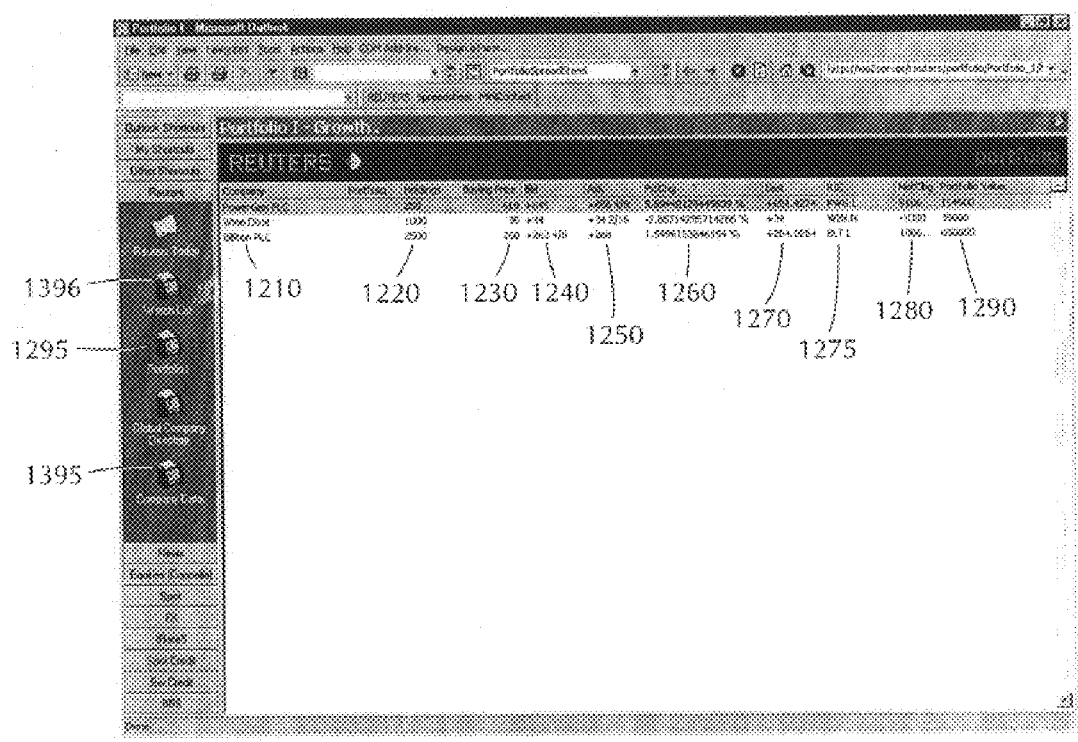

Spreadsheet Sub-View: The Spreadsheet Sub-View, shown in FIG. 6, is a display in an Outlook View Control. The displayed data is from a data in a personal Exchange folder, the "Portfolio" folder, located among folders 360 of server 350 shown in FIG. 2. That Portfolio folder contains Outlook Contact items that provide information on instruments pertaining to companies added to the Portfolio folder from the Global Company Directory (folder). A user can have more than one Portfolio folder, for example, to group instruments of the same type (e.g., stocks, bonds) together.

In particular, the fields displayed in the Spreadsheet Sub-View for each item are as follows: the company identity (1210), the holdings (for example, the user's holdings) in the company (1220), the buying price of the holdings (1230), the current bid and asking prices (1240 and 1250), the percent change from the purchase price (1260), the last price the holding traded at (1270), the RIC for the company (1275), the net change in value since purchase (1280), and the current value of the holdings in the company (1290). The field identifers of the standard Outlook Contact form were edited, using the standard Outlook editing features, to display the appropriate labels so that the user can readily identify these fields.

The data contained in these fields was obtained in a manner similar to that described above in connection with the Watch List Sub-View. In particular, the data in fields 1210 and 1275 originate from the Global Company Directory when the item is dragged and dropped therefrom, and fields 1240, 1250, 1260 and 1270 are provided by the Quotes COM Add-In. Fields 1220 and 1230 are input directly onto the Contact form for the item by the user, and fields 1280 and 1290 are calculated by the Portfolio COM Add-In.

Items can be added/deleted to the Portfolio folder by utilizing standard Outlook edit functions or by dragging and dropping an item from the Global Company Directory onto the Portfolio shortcut 1295, shown in FIG. 7. When the user double clicks on a company, a record is displayed as in FIG. 10, which provides additional information. The Fields on the Contact Item that are used for portfolio management then can be edited to add buying price, holdings, upper and lower limits. Also, when an item is added to the Spreadsheet Sub-View, events (in this case dividend dates) associated with that item are added to the Events Sub-View by the Quotes COM Add-In, and the Remainder COM Add-In (described below) prompts if the user wishes to set limits. Conversely when an item is deleted from the Spreadsheet Sub-View, the events are automatically removed by the Limit Minder COM Add-In from the Events Sub-View, and the limit minders, if set, are automatically deleted. The Reminder COM Add-In (described below) monitors limit values.

Figure 12:
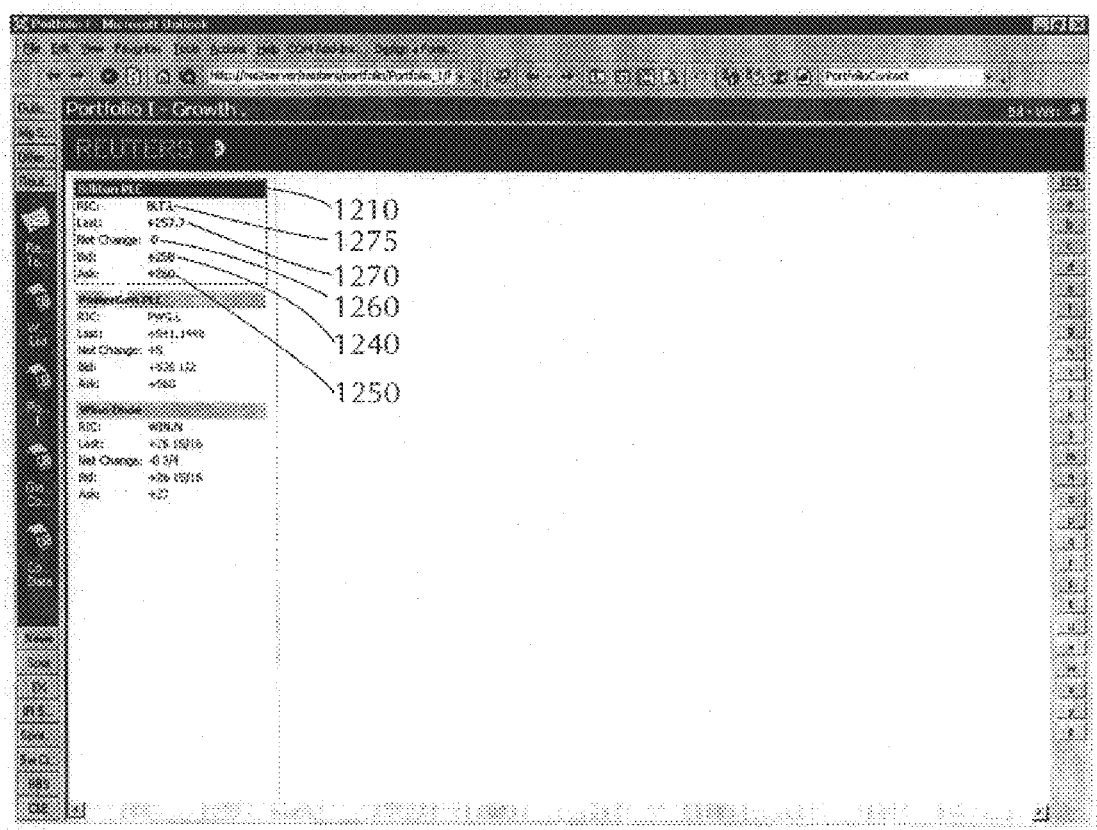
FIG. 12 is a screen display showing the Mini Contact Sub-View.

Mini Contact Sub-View: The Mini Contact Sub-View, shown in FIG. 12, is a display using an Outlook View Control of data contained in the "Portfolio" folder, found among folders 360 of server 350, shown in FIG. 2. The Outlook View Control can be embedded in a frame of a Web Page (Active Server Page or HTML). Items are added/deleted to this folder by utilizing standard Outlook edit functions or by dragging and dropping an item from the Global Company Directory onto the Portfolio shortcut icon.

The Mini Contact Sub-View displays items from the same folder as the spreadsheet Sub-View. In the Mini Contact Sub-View however, there is displayed only the following fields for an item, and in a column format different from that used for the Spreadsheet Sub-View: the company identity (1210), the company RIC (1275), the last price the instrument traded at (1270), the present charge from the Purchase price 1260; labeled "net charge" in FIG. 12), and the current bid and asking prices (1240 and 1250). The identifiers for the fields displayed in this view are created using standard Outlook editing functions. When the user double clicks on an item in the Mini Contact Sub-View, a more detailed information record is displayed as in FIG. 10.

Reuters Business Briefing Sub-View: The Reuters Business Briefing ("RBB") Sub-View 1410, shown in FIG. 8, uses the Reuters News Component "(RNC)" with the RBB 'pane' property set to visible. The RNC is a COM object provided by Reuters to users of RBB, as well as to users of certain Reuters products, such as PowerPlus Pro, which retrieves headlines and stories from the RBB news source. The information is obtained using technique 500, shown in FIG. 2. The headlines are the result of a filtered search initiated by the user from the Reuters Business Briefing News source, in accordance with the previously described procedures of FIGS. 11B and 11C. Upon double clicking on a headline in the RBB Sub-View, the RNC displays a pop-up window containing the associated story content.

Internet Sub-View: The Internet Sub-View 1420, shown in FIG. 8, displays search results within a web browser that are received from an Internet search engine, "Alta Vista" in the case of FIG. 8. This is accomplished by setting the Sub-View to a folder on server 520, shown in FIG. 2, which contains an ASP script, coded with an Alta Vista search string. The search criteria is passed into this string via News COM Add-In 622, as previously described. The Alta Vista search engine performs the search and the results are displayed via HTML in the web browser.

Company Detail Sub-View: The Company Detail Sub-View 1330, shown in FIG. 7, is HTML formatted data retrieved from the relevant Outlook Contact Item in the Global Company Directory as a result of the filter set on the Company Data page. The information displayed represents certain fields of the Outlook Contact item shown in FIG. 10, except that data is extracted from certain fields of the item in the Global Company Directory and embedded in an HTML-formatted configuration. This is performed by scripting in the Company Data ASP, which sets the filter for Company Detail Sub-View 1330. Sub-View 1330 displays the fields from the Global Company Directory based upon the filter set.

Full Quote Sub-View: The Full Quote Sub-View, shown as 1310 in FIG. 7, is an ActiveX Control which gets pricing information from quotes source 20 shown in FIG. 1. The Active X Control receives the pricing data from OLE DB Simple Provider Interface 470. This is accomplished via Data Binding, a standard Microsoft protocol that binds user interface controls to a field or fields in a database, OLE DB Simple Provider Interface 470 in this case. The ActiveX Control also exposes a property that provides updates to the index (1385 in FIG. 7) using Internet Explorer's Document Object Model, and exposes a property that is set by scripting on the Company Data Master View, as discussed above.

Real Time Tick Chart Sub-View: The Real Time Tick Chart Sub-View 1030, shown in FIG. 4, uses the Microsoft Office Web Components ChartSpace and Spreadsheet objects for the display of updated price data. The Spreadsheet object, which is executed in Information Appliance 150, connects to the Data Server 430 via the OLE DB Simple Provider 470 and provides a RIC to Data Server 430, and sends a request for a record set that it will use to create the chart. The Spreadsheet object is then returned as a record set via the OLE DB Simple Provider 470. The Spreadsheet object extracts the data on which to chart from the record set and adds these to the next available spreadsheet cells. The spreadsheet cells are mapped to the ChartSpace object by calling methods exposed by the ChartSpace object. The mapping binds the cell data to the ChartSpace Object. The ChartSpace object then renders the data received as a line graph. Subsequent updates to the Spreadsheet cells are provided by record set change events via OLE DB Simple Provider 470 and the above process is once again followed.

Dynamic View Manager

The Dynamic View Manager (see Exhibit L) is a tool which can be used to create views of information. These views can include the Sub-Views described above, as well as other information, data and objects. In particular, by clicking on images on the banner page, a frame may be split horizontally or vertically to create frame layouts. Splitting of a frame can be done any number of times to provide multiple frames. Any frame can be sized horizontally or vertically by dragging its border.

Figure 14:
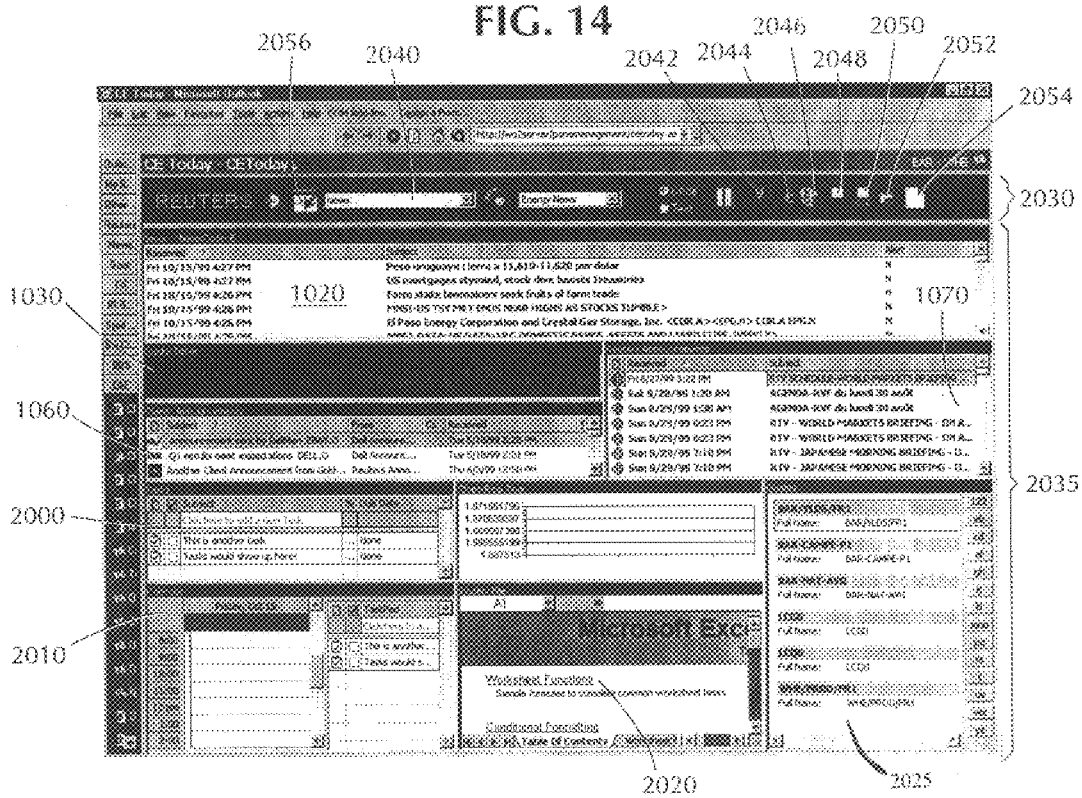
FIG. 14 is an exemplary screen display created using the Dynamic View Manager in this invention.

A screen display showing an example of the multiple frames that can be created by the user with the Dynamic View Manager is shown in FIG. 14. As can be seen, the user has in this case created a display that shows the News Sub-View 1020, the Real Time Tick Chart Sub-View 1030, the Client Announcements Sub-View 1060, the Provider Announcements Sub-View 1070, the Quotes Sub-View 2025, and the Ticker Sub-View 1030. (The Quotes Sub-View 2025 is a variant of the previously-described Full Quote Sub-View shown as 1310 in FIG. 7, showing the RIC and RIC name.) In addition, in this case the user has also created frames that display the user's Outlook Task items 2000, an Outlook Calendar view 2010, and a system file view 2020 (in this case, the system file is an Excel spreadsheet). The choice of these views is entirely arbitrary to the user.

The Dynamic View Manager utilizes HTML framesets. The Dynamic View Manager itself is an HTML page containing HTML framesets. The outermost frameset consists of the banner frame 2030 and the layout frame 2035. Banner frame 2030 is created by an ASP on server 107 (see FIG. 1) that gets converted to HTML on the user's information appliance. Layout frame 2035 consists of "activity frames" and "zone frames". An "activity frame" is an HTML frame that displays information or has the capability to display information; the views 1030, 1060, 2000, etc., which are shown in FIG. 14, are each contained in an activity frame. A "zone frame" is an HTML frame with zero height and provides in the display a visual user interface for adding activity frames to a layout. A "layout" is a display created by the user; FIG. 14 depicts such a layout.

The layout frame 2035 initially contains three frames, as shown in FIG. 15. The top frame 2037 and bottom frame 2039 of the layout frame 2035 are zone frames (shown as having height for ease of reference). For new layouts, the middle frame 2038 initially contains a blank activity frame. In the case of a saved screen (discussed below) containing multiple activity frames, the middle frame 2038 consists of a frameset serving as the root of the tree of framesets and activity frames that constitute the layout.

To add frames, the activity frame 2038 shown in FIG. 15 can be split horizontally or vertically by focusing the screen cursor on activity frame 2038 and activating, respectively, the horizontal or vertical scissors icons (described below). An activity frame can be blank or contain a Sub-View when it is split.

When the user splits a frame, the following occurs:
1. A Script in the HTML code for banner frame 2030 stores information about what is currently displayed in the activity frame 2038.
2. The activity frame 2038 is replaced by a new frameset containing two frames.
3. The left or top frame in the frameset—depending upon the splitting direction—references the original activity frame source (the one prior to splitting) with the information that was saved in the banner frame.
4. The right or bottom frame in the new frameset—depending upon the splitting direction—is a blank activity frame.

A user adds frames by dragging the border of the top zone frame downward or dragging the border of the bottom zone frame upward. This results in the creation of a new blank activity frame at the top or bottom of the layout, respectively.

When a user drags the border of a zone frame, the following occurs:
1. A Script in the HTML code for the top (or bottom) zone frame gets notified that the zone frame's height is increasing.
2. When the height is greater than zero, the top (or bottom) zone frame replaces itself with a new frameset containing two frames.
3. The top or bottom frame in the new frameset—depending upon which zone border was dragged—is a new zone frame. The other frame in the new frameset is a blank activity frame.

Any number of new activity frames that span the entire layout frame width can be created at the top or bottom of the layout in this manner.

A number of icons can be provided on banner frame 2030 to facilitate use of the Dynamic View Manager. In particular, there is provided a vertical scissors icon 2042, which allows the user to split a selected frame vertically; a horizontal scissors icon 2044, which allows the user to split a selected frame horizontally; a wastebasket icon 2046, which allows a user to delete a selected frame; a disk icon 2048, which when clicked saves the layout; a disk icon 2050, which allows saving the layout under a new name; a folder icon 2052, which allows a user to open a previously-saved layout; and a page icon 2054, which allows a user to start a new layout.

The operations that are initiated when either of scissor icons 2042 and 2044 are clicked are described above. When the user prepares a layout and then clicks on the "save" icon 2048 or the "save as" icon 2050 in banner frame 2030, the user is presented with an HTML dialog box, which displays the previously saved layouts, if any. These layouts are located in the user's personal screens folder or other screens folders (e.g., a public screens folder) on the web server as XML files.

After the user decides on a name to save the layout to (either overwriting an existing layout, or creating a new one), script in the HTML code for banner frame 2030 does a depth-first traversal of the layout frame's HTML page tree hierarchy of framesets and activity frames. In the process, the HTML tree hierarchy is flattened so that the depth of nested framesets is minimized. In addition, activity frames that were created by dragging the border of the zone frames are incorporated into the original middle frame of the layout frame. An XML file is then constructed that represents the layout (a sample XML file is attached as Exhibit M).

Each XML element contains the size of the frameset or activity frame that it represents. For XML elements that represent framesets, the XML element specifies whether its frames are arranged as rows or columns. For XML elements that represent activity frames, the XML element contains the information necessary to reconstruct the activity frame.

When the user clicks on the folder icon 2052 on the banner frame 2030 (indicating that the user wishes to utilize a previously-saved layout), the user is presented with an HTML dialog of his available layouts. Upon choosing a layout, the XML file representing the layout is loaded by script in the HTML code for banner frame 2030. The XML is parsed, and the parsed tree is traversed. The information in the tree is then used to reconstruct the layout frame.

Inserting Sub-Views in frames: The component drop down Combo Box 2040 on the banner frame 2030 lists all the Sub-Views that can be inserted into a frame using the Dynamic View Manager, such as News, Quotes, Provider Announcements, and the like. To insert one of these Sub-Views into a frame, the user selects a previously-created frame by clicking on it, and then selects an item in the Combo Box. The user then clicks on the "insert" image icon 2056 on banner frame 2030, activating script in the banner frame, which results in inserting the selected Sub-View into the frame. In addition, upon clicking on the selected Sub-View, the user is prompted in certain cases for additional information to provide the desired view. For example, in the case of selecting the News Sub-View, two radio buttons are displayed on the banner page for selecting whether news headlines are to be filtered by a provider-specific code or codes, or by using a free text search.

In addition to permitting Sub-Views to be inserted into frames, the Dynamic View Manager also enables the user to insert into frames Standard Outlook Shortcuts (Calendar, Inbox, Tasks Notes, Contact, Journal), Outlook folders, files, such as system files, and URLs. Again, these items are listed in the component drop down Combo Box 2040, and placed in a frame by the user clicking on the appropriate description in that box. These items are merely representative of the information that can be displayed using the Dynamic View Manager.

The program coding for the Dynamic View Manager described above utilizes a monolithic architecture, and is set forth in source code form in part_of the appendix to this disclosure. As an alternative, the Dynamic View Manager can be implemented using a kernel with a number of subview modules, which allows a user to extend the type of subviews that can be displayed. The kernel and these modules can be resident on any of web servers shown in figures, for example, server 107 of FIG. 1, or server 340 or server 520, both of FIG. 2.

In this alternative, the kernel is 100% HTML code and contains instructions for performing the following functions, as well as instructions for creating a toolbar so that the user can activate these functions:

Creating a new screen layout.

Saving a screen layout.

Loading a saved screen layout.

Splitting an activity frame horizontally or vertically.

Dragging new activity frames into the top and bottom of the screen layout.

Deleting an activity frame.

Specifying the subview that an activity frame is to display.

The toolbar can either be docked (i.e., fixed in its current location), or may be dragged and made to float anywhere on the desktop's screen (i.e., a floating window). The tool bar may also be hidden to save screen real estate, and then made to reappear. Further, the location where screens are saved to and loaded from is configurable, either on the web server or by the user.

The kernel is also responsible for interfacing with the subview modules. A configuration XML file exists on any of the previously described web servers, which describes the set of subviews that may be displayed in the Dynamic View Manager. Each element in the XML file describes a subview module; a subview module consists of the subview's name, script for displaying the subview, and a toolbar for modifying the data that is displayed in the subview. Each subview's name appears in a combobox on the kernel's toolbar.

For each subview, the XML element provides a URL to the HTML toolbar that the subview displays when the active frame is the activity frame containing that subview. The subview's toolbar is merged into the toolbar that the kernel provides, and an empty space is present in the kernel's toolbar into which a subview's toolbar is inserted. For example, a Quotes subview toolbar consists of an HTML text box in which the user can type the instrument that he is interested in viewing in the subview.

Each XML element also provides the URL to a subview implementation script file (ex. JavaScript or VBScript), that includes functions for creating, destroying and resizing a subview of the given type. The script also provides functions to save the subview's state information in XML and to reload its state from XML. The XML containing the subview's state information is incorporated into the XML file that describes a saved screen.

In this embodiment, a conventional Microsoft "about" protocol is used to speed up loading and avoid the performance penalties involved in loading each activity page from the web server. This protocol allows the creation of an URL that references an HTML string in memory; for example, "about:<body>Hello</body>" is a URL that creates an HTML page that displays "Hello". The screen loading process involves creating blank activity frames in memory using the "about" protocol, and then calling functions in subview script implementation files to create the subview displays.

Additional COM Add-Ins

In addition to the COM Add-Ins described in connection with FIG. 2 above, other COM Add-Ins (generically denoted as 626 in FIG. 2) further expand the functionality of appliance 600. These Add-Ins are as follows:

Portfolio COM Add-In (see Exhibit E): The Portfolio COM Add-In is used to performs the calculations (portfolio value, current value, change in value over a stated time period, percent change in value) required by the items in the Portfolio, Watch List and Netting folders.

When the Portfolio COM Add-In starts, it locates all the user's relevant folders. For each folder it finds, it creates an object, which has a reference to the folder and the corresponding Outlook Contact item. If a new folder was created prior to the Portfolio COM Add-In starting, the COM Add-In object will create a corresponding Outlook Contact item and reference it to the newly-created folder. Thus, for each relevant folder, there is an associated Portfolio COM Add-In object and Contact item. Each Portfolio COM Add-In object then calculates the values of the fields of each item (discussed above) in each relevant folder and provides the results to the appropriate fields in the corresponding Contact item. The details of how these calculations are performed is well-known in the art. The associated Sub-View for this Contact item then displays the information, in the Standard Outlook View Control.

Limit Minder COM Add-In (see Exhibit F): This COM Add-In monitors the last price for a specified instrument. The Limit Minder COM Add-In checks certain fields of items contained in certain folders to see if user set limits have been reached.

The Limit Minder COM Add-In monitors contact items in two folders in the preferred embodiment, the Portfolio and Watch List folders. At suitable intervals set as part of the Limit Minder COM Add-In, the Limit Minder fields of the items in the Portfolio and Watch List folders are read by this Add-In and compared to the current market value fields. The fields containing the current market values are provided by the Quotes COM Add-In, as discussed above. If the last value for a contact item falls below or above the corresponding limit set by the user, then the Limit Minder COM Add-In alerts the user and displays a form (not shown) that allows the user to set new limits, cancel or ignore the limit minder.

The limits for a particular item (an equity instrument in the preferred embodiment) are set by dragging the contact item corresponding to the instrument onto either the Portfolio or Watch List folders, thus adding a new item to the folder in question. (In the Today Main View illustrated in FIG. 4, the item can be dragged from the Today Main View onto the shortcut for either folder, which appear at the left edge of the view). The Reminder COM Add-In monitors for such an event, and upon occurrence of one, triggers a prompt to the user asking if the user wishes to set a limit reminder for the added item. If the response to the prompt is yes, then a form (not shown) is displayed to allow the user to set upper and lower limits for that item.

While the present invention has been described in detail with reference to the preferred embodiment thereof, many modifications and variations thereof will be readily apparent to those skilled in the art. Accordingly, the scope of the invention is not to be limited by the details of the preferred embodiment described above, but only by the terms of the appended claims.

What is claimed is:

1. A system for delivering dynamic data, comprising:

a folder whose contents can be viewed by a client application running on a workstation, the folder being stored on a server;

an information extractor unit, which obtains information from a dynamic datastream from an information provider in accordance with a registry of interests for one of a plurality of users;

a mail object handling unit, which creates a mail object containing the information obtained by said information extracting unit and stores the mail object in the folder for viewing by a user of the client application.

2. A method for delivering data, comprising the steps of:

creating a folder whose contents can be viewed by a client application running on a workstation, and storing the folder on a server;

obtaining information from a dynamic datastream from an information provider in accordance with a registry of interests for one of a plurality of users;

creating a mail object containing the obtained information from the dynamic datastream; and storing the mail object in the folder for viewing by a user of the client application.

3. A method according to claim 2, wherein said obtaining step, said mail-object creating step and said mail-object storing step are performed each time new data is published to the stream of data.

4. A method according to claim 2, wherein the dynamic datastream includes news items, and the information contained in the mail object is information relating to a news item.

5. A method according to claim 2, wherein the information contained in the mail object includes a headline, date and time information, and information relating to the subject of the news item.

6. A method according to claim 4, wherein the dynamic datastream includes financial information.

7. A method according to claim 6, wherein the financial information is viewable as a scrolling ticker stream.

8. A method according to claim 2, further comprising the step of the user specifying datum from the dynamic datastream a limit value, and the step of providing the user with an alert in response to the limit value being met by datum received in the dynamic datastream.

9. A method according to claim 2, further comprising the step of storing financial data relating to one or more companies.

10. A method according to claim 9, further comprising the step of providing a view in which the user can view the financial data relating to a plurality of the companies.

11. A method according to claim 10, wherein said view permits the user to select one of the companies and to view data relating to that company.

12. A computer-readable memory medium storing executable program code for causing execution of a method for delivering dynamic data, said method comprising the steps of:

creating a folder whose contents can be viewed by a client application running on a workstation, and storing the folder on a server;

obtaining information from a dynamic datastream from an information provider in accordance with a registry of interests for one of a plurality of users;

creating a mail object containing the obtained information; and storing the mail object in the folder for viewing by a user of the client application.

* * * * *